US012388166B2

(12) United States Patent
Jung et al.

(10) Patent No.: US 12,388,166 B2
(45) Date of Patent: Aug. 12, 2025

(54) ANTENNA MODULE AND ELECTRONIC DEVICE COMPRISING SAME

(71) Applicant: Samsung Electronics Co., Ltd., Gyeonggi-do (KR)

(72) Inventors: Dongjin Jung, Gyeonggi-do (KR); Chanju Park, Gyeonggi-do (KR); Jungi Jeong, Gyeonggi-do (KR); Taeksun Kwon, Gyeonggi-do (KR); Jungwoo Seo, Gyeonggi-do (KR); Junhwa Oh, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 142 days.

(21) Appl. No.: 18/547,977

(22) PCT Filed: Apr. 28, 2022

(86) PCT No.: PCT/KR2022/006082
§ 371 (c)(1),
(2) Date: Aug. 25, 2023

(87) PCT Pub. No.: WO2022/250310
PCT Pub. Date: Dec. 1, 2022

(65) Prior Publication Data

US 2024/0136703 A1 Apr. 25, 2024
US 2024/0235009 A9 Jul. 11, 2024

(30) Foreign Application Priority Data

May 25, 2021 (KR) ........................ 10-2021-0066644

(51) Int. Cl.
*H01Q 21/00* (2006.01)
*H01Q 1/24* (2006.01)
*H01Q 1/38* (2006.01)

(52) U.S. Cl.
CPC ............... *H01Q 1/243* (2013.01); *H01Q 1/38* (2013.01); *H01Q 21/0075* (2013.01)

(58) Field of Classification Search
CPC ...... H01Q 1/243; H01Q 1/38; H01Q 21/0075; H01Q 1/246; H01Q 9/0414; H01Q 21/08; H01Q 21/24
See application file for complete search history.

(56) References Cited

U.S. PATENT DOCUMENTS 7,289,078 B2 10/2007 Navarro
7,839,236 B2 11/2010 Dupuy et al.
(Continued)

FOREIGN PATENT DOCUMENTS

JP 2017-073736 4/2017
JP 2021-057705 4/2021
(Continued)

OTHER PUBLICATIONS

PCT/ISA/210 Search Report dated Aug. 10, 2022, issued on PCT/KR2022/006082, pp. 6.
(Continued)

*Primary Examiner* — David E Lotter
(74) *Attorney, Agent, or Firm* — The Farrell Law Firm, P.C.

(57) ABSTRACT

An antenna module, according to various embodiments, may comprise: a first layer including a first etching region, a first via pad disposed to be spaced apart from an edge of the first etching region, and a first via hole disposed on one surface of the first via pad; and a second layer stacked on one surface of the first layer, and including a second etching region, a plurality of second via pads disposed to be spaced apart from an edge of the second etching region, a plurality of second via holes disposed on one surface of the plurality of second
(Continued)

via pads, and a plurality of second dividing lines electrically connecting the plurality of second via pads.

15 Claims, 18 Drawing Sheets

(56) References Cited

U.S. PATENT DOCUMENTS

| | | | |
|---|---|---|---|
| 9,112,270 B2 | 8/2015 | Warnick et al. | |
| 10,396,432 B2 | 8/2019 | Kim et al. | |
| 10,541,461 B2 | 1/2020 | Teshiba | |
| 2003/0080836 A1 | 5/2003 | Nagaishi et al. | |
| 2020/0373647 A1* | 11/2020 | Lee | H01Q 1/243 |

FOREIGN PATENT DOCUMENTS

| | | |
|---|---|---|
| KR | 10-0904638 | 6/2009 |
| KR | 10-2018-0087095 | 8/2018 |
| KR | 10-2019-0080452 | 7/2019 |

OTHER PUBLICATIONS

PCT/ISA/237 Written Opinion dated Aug. 10, 2022, issued on PCT/KR2022/006082, pp. 5.

* cited by examiner

ANTENNA MODULE AND ELECTRONIC DEVICE COMPRISING SAME

PRIORITY

This application is a National Phase Entry of PCT International Application No PCT/KR2022/006082, which was filed on Apr. 28, 2022, and claims priority to Korean Patent Application No. 10-2021-0066644, which was filed on May 25, 2021, the entire content of each of which is incorporated herein by reference.

TECHNICAL FIELD

Various embodiments of the disclosure relate to an antenna module, and more particularly, to an antenna module and an electronic device including the same.

BACKGROUND ART 5G mobile communication technology defines a wide frequency band to enable a fast transmission speed and new services, and may be implemented not only in a frequency ('sub 6 GHz') band of 6 GHz or less such as 3.5 GHz, but also in an ultra high frequency band ('above 6 GHz') called a mmWave such as 28 GHz and 39 GHz. Further, in the case of 6G mobile communication technology, which is referred to as a beyond 5G system, in order to achieve a transmission speed that is 50 times faster than that of 5G mobile communication technology and ultra-low latency reduced to 1/10 compared to that of 5G mobile communication technology, implementations in terahertz bands (e.g., such as 95 GHz to 3 terahertz (3 THz) band) are being considered.

In the early days of 5G mobile communication technology, with the goal of satisfying the service support and performance requirements for an enhanced mobile broadband (eMBB), ultra-reliable low-latency communications (URLLC), and massive machine-type communications (mMTC), standardization has been carried out for beamforming and massive MIMO for mitigating a path loss of radio waves in an ultra-high frequency band and increasing a propagation distance of radio waves, and support for various numerologies (multiple subcarrier spacing operation, and the like) for efficient use of ultra-high frequency resources and dynamic operation for slot formats, initial access technology for supporting multi-beam transmission and broadband, a definition and operation of a band-width part (BWP), a new channel coding method such as low density parity check (LDPC) code for large capacity data transmission and polar code for high reliable transmission of control information, L2 pre-processing, and network slicing that provides a dedicated network specialized for specific services.

Currently, discussions are ongoing to improve initial 5G mobile communication technology and enhance a performance thereof in consideration of services that 5G mobile communication technology was intended to support, and physical layer standardization for technologies such as vehicle-to-everything (V2X) for helping driving determination of an autonomous vehicle and increasing user convenience based on a location and status information of the vehicle transmitted by the vehicle, new radio unlicensed (NR-U) for the purpose of a system operation that meets various regulatory requirements in unlicensed bands, NR UE power saving, a non-terrestrial network (NTN), which is direct UE-satellite communication for securing coverage in areas where communication with a terrestrial network is impossible, and positioning is in progress.

Further, standardization in the field of air interface architecture/protocol for technologies such as industrial Internet of things (IIoT) for supporting new services through linkage and convergence with other industries, integrated access and backhaul (IAB) that provides nodes for expanding network service areas by integrating wireless backhaul links and access links, mobility enhancement including conditional handover and dual active protocol stack (DAPS) handover, and 2-step RACH for NR that simplifies a random access procedure is also in progress, and standardization in the field of system architecture/service for 5G baseline architecture (e.g., service based architecture, service based interface) for applying network functions virtualization (NFV) and software-defined networking (SDN) technologies, mobile edge computing (MEC) that receives services based on a location of a UE, and the like is also in progress.

When such a 5G mobile communication system is commercialized, connected devices in an explosive increase trend will be connected to communication networks; thus, it is expected that function and performance enhancement of a 5G mobile communication system and integrated operation of connected devices will be required. To this end, new research on eXtended reality (XR) for efficiently supporting augmented reality (AR), virtual reality (VR), mixed reality (MR), and the like, 5G performance improvement and complexity reduction using artificial intelligence (AI) and machine learning (ML), AI service support, metaverse service support, and drone communication will be conducted.

Further, the development of such a 5G mobile communication system will be the basis for the development of full duplex technology for improving frequency efficiency and system network of 6G mobile communication technology, satellite, AI-based communication technology that utilizes artificial intelligence (AI) from a design stage and that realizes system optimization by internalizing end-to-end AI support functions, and next generation distributed computing technology that realizes complex services beyond the limits of UE computing capabilities by utilizing ultra-high-performance communication and computing resources as well as a new waveform for ensuring coverage in a terahertz band of 6G mobile communication technology, full dimensional MIMO (FD-MIMO), multi-antenna transmission technologies such as an array antenna and large scale antenna, metamaterial-based lenses and antennas for improving coverage of terahertz band signals, high-dimensional spatial multiplexing technology using orbital angular momentum (OAM), and reconfigurable intelligent surface (RIS) technology.

DISCLOSURE

Technical Problem

Various embodiments provide an antenna array module that implements vertically a feeding network in order to solve space limitations.

Various embodiments provide an antenna module for maximizing isolation between branched wirings in a THz band by inserting a ground (GND) layer in a vertical branch structure.

Various embodiments provide a power divider implemented vertically that may be operated without a separate impedance matching circuit using impedance by a parasitic component generated in via transition of a vertical structure.

Technical Solution

According to various embodiments, an antenna module includes a first layer including a first etching area, a first via pad disposed to be spaced apart from an edge of the first etching area, and a first via hole disposed at one surface of the first via pad; a second layer stacked on one surface of the first layer and including a second etching area, a plurality of second via pads disposed to be spaced apart from an edge of the second etching area, a plurality of second via holes disposed at one surface of the plurality of second via pads, and a plurality of second dividing lines configured to electrically connect the plurality of second via pads; a third layer stacked on one surface of the second layer and including a plurality of third etching areas, a plurality of third via pads disposed to be spaced apart from an edge of the plurality of third etching areas, and a plurality of third via holes disposed at one surface of the plurality of third via pads; a fourth layer stacked on one surface of the third layer and including a plurality of fourth etching areas, a plurality of fourth pads disposed to be spaced apart from edges of the plurality of fourth etching areas, a plurality of fourth via holes disposed at one surface of the plurality of fourth via pads, and a plurality of fourth dividing lines; a fifth layer stacked on one surface of the fourth layer and including a plurality of fifth etching areas and a plurality of fifth via pads disposed to be spaced apart from edges of the plurality of fifth etching areas; and a plurality of antennas electrically connected to the plurality of fifth via pads.

Advantageous Effects

An antenna module according to various embodiments can solve space limitations by implementing vertically a feeding network.

An antenna module according to various embodiments can maximize isolation between branched wirings in a THz band by inserting a ground (GND) layer in a vertical branch structure.

An antenna module according to various embodiments can operate without a separate impedance matching circuit using impedance by a parasitic component generated in via transition of a vertical structure.

MODE FOR DISCLOSURE

Hereinafter, an operating principle of the disclosure will be described in detail with reference to the accompanying drawings. In the following description, in describing the disclosure, in the case that it is determined that a detailed description of a related well-known function or constitution may unnecessarily obscure the gist of the disclosure, a detailed description thereof will be omitted Terms described below are terms defined in consideration of functions in the disclosure, which may vary according to intentions or customs of users and operators. Therefore, the definition should be made based on the content throughout this specification.

Hereinafter, a term identifying a communication or an access node used in the description, a term indicating network entities, a term indicating messages, a term indicating an interface between network objects, a term indicating various identification information and the like are exemplified for convenience of description. Accordingly, the disclosure is not limited to the terms described below, and other terms indicating an object having an equivalent technical meaning may be used.

Hereinafter, for convenience of description, the disclosure uses terms and names defined in 5GS and NR standards, which are the latest standards defined by the 3rd generation partnership project (3GPP) organization among currently existing communication standards. However, the disclosure is not limited by the terms and names, and may be equally applied to a wireless communication network conforming to other standards. In particular, the disclosure is applicable to 3GPP 5GS/NR (5th generation mobile communication standard).

Figure 1:
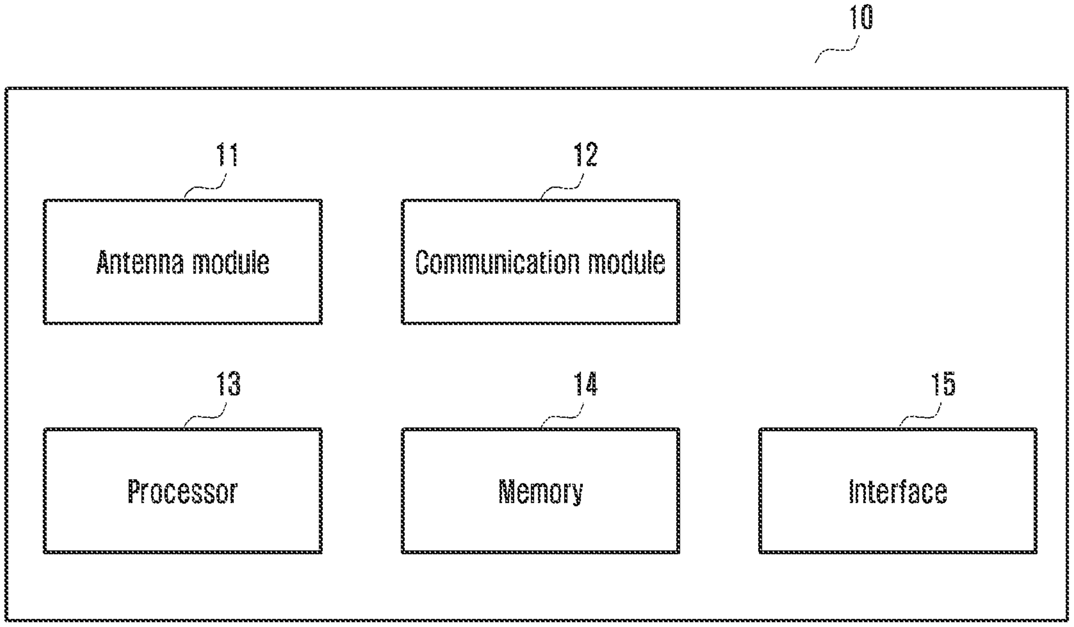
FIG. 1 is a block diagram illustrating an electronic device 10 in a network environment according to various embodiments.

FIG. 1 is a block diagram illustrating an electronic device 10 in a network environment according to various embodiments.

With reference to FIG. 1, in a network environment, the electronic device 10 may communicate with another electronic device (not illustrated) or a server (not illustrated) through a network (e.g., wired or wireless communication network). For example, the electronic device 10 may be a base station. Another electronic device may be a terminal.

According to an embodiment, the electronic device 10 may include an antenna module 11, a communication module 12, a processor 13, a memory 14, and an interface 15. In some embodiments, at least one of these components may be omitted in the electronic device 10 or one or more other components may be added to the electronic device 10. In some embodiments, some of these components may be integrated into a single component.

The processor 13 may, for example, control at least one other component (e.g., hardware or software component) of the electronic device 10 connected thereto and perform various data processing or calculations. According to an embodiment, as at least part of data processing or calculation, the processor 13 may store commands or data received from other components (e.g., the communication module 12) in the memory 14, process the commands or data stored in the memory 14, and store the resulting data in the memory 14.

The memory 14 may store various data used by at least one component of the electronic device 10. The data may include, for example, software and input data or output data for commands related thereto.

The interface 15 may support one or more specified protocols that may be used for enabling the electronic device 10 to connect directly or wirelessly with another electronic device. According to an embodiment, the interface 15 may include, for example, a universal serial bus (USB) interface or a secure digital (SD) card interface.

The communication module 12 may support establishing a wired communication channel or a wireless communication channel between the electronic device 10 and another electronic device or server, and performing communication through the established communication channel. The communication module 12 may include one or more communication processors that operate independently of the processor 13 and that support wired or wireless communication. According to an embodiment, the communications module 12 may communicate with other electronic devices or servers through a legacy cellular network, a 5G network, a next generation communication network, the Internet, or a computer network (e.g., telecommunication network such as local area network (LAN) or wide area network (WAN)). These various types of communication modules may be integrated into one component (e.g., single chip) or implemented into a plurality of separate components (e.g., a plurality of chips).

The communication module 12 may support a 5G network after the 4G network and a next generation communication technology, for example, new radio access technology (NR access technology). NR access technologies may support enhanced mobile broadband (eMBB)) of high-capacity data, terminal power minimization and massive machine type communications (mnMTC), or ultra-reliable and low-latency communications (URLLC). The communication module 12 may support, for example, a high frequency band (e.g., mmWave band) in order to achieve a high data rate. The communication module 12 may support various technologies for securing a performance in a high frequency band, for example, technologies such as beamforming, massive multiple-input and multiple-output (MIMO), full dimensional MIMO (FD-MIMO), array antenna, analog beam-forming, or large scale antenna. The communication module 12 may support various requirements specified for the electronic device 10, other electronic devices, or network systems.

The antenna module 11 may transmit or receive signals or power to or from the outside (e.g., other electronic devices). According to an embodiment, the antenna module 11 may include an antenna including a radiator formed with a conductor or a conductive pattern formed on a substrate (e.g., PCB). According to an embodiment, the antenna module 11 may include a plurality of antennas (e.g., array antenna). In this case, at least one antenna appropriate for a communication method used in the network may be selected from the plurality of antennas by, for example, the communication module 12. A signal or power may be transmitted or received between the communication module 12 and another external electronic device through the selected at least one antenna. According to some embodiments, in addition to the radiator, other components (e.g., radio frequency integrated circuit (RFIC)) may be additionally formed as a part of the antenna module 11.

According to various embodiments, the antenna module 11 may form a mmWave antenna module. According to an embodiment, the mmWave antenna module may include a printed circuit board, an RFIC disposed on or adjacent to a first surface (e.g., lower surface) of the printed circuit board and capable of supporting a designated high frequency band (e g, mmWave band), and a plurality of antennas (e.g., array antennas) disposed on or adjacent to a second surface (e.g., upper surface or side surface) of the printed circuit board and capable of transmitting or receiving signals of the designated high frequency band.

At least some of the components may be connected to each other through a communication method between peripheral devices (e.g., bus, general purpose input and output (GPIO), serial peripheral interface (SPI), or mobile industry processor interface (MIPI)) and exchange signals (e.g., commands or data) with each other.

According to an embodiment, commands or data may be transmitted or received between the electronic device 10 and another external electronic device through a server connected to a network. Other external electronic devices may be devices of the same type as or different type from that of the electronic device 10. According to an embodiment, all or part of operations executed in the electronic device 10 may be executed in another external electronic device. For example, in the case that the electronic device 10 needs to perform a certain function or service automatically or in response to a request from a user or other device, the electronic device 10 may request to one or more external electronic devices to perform a function or at least part of the service additionally or instead of executing the function or service by itself. One or more other external electronic devices that have received the request may execute at least a part of the requested function or service or an additional function or service related to the request, and transfer the result of the execution to the electronic device 10. The electronic device 10 may provide the result as it is or the result obtained after additional processing as at least part of a response to the request. To this end, for example, cloud computing, distributed computing, mobile edge computing (MEC), or client-server computing technology may be used. The electronic device 10 may provide an ultra-low latency service using, for example, distributed computing or mobile edge computing. In another embodiment, other external electronic devices may include internet of things (IoT) devices.

An electronic device according to various embodiments disclosed in this document may be various types of devices. The electronic device according to the embodiment of this document is not limited to the above-described devices.

It should be understood that various embodiments of this document and terms used therein are not intended to limit the technical features described in this document to specific embodiments, but include various modifications, equivalents, or substitutions of the embodiments. In connection with the description of the drawings, like reference numerals may be used for similar or related components. The singular form of the noun corresponding to the item may include one or more of the item, unless the relevant context clearly dictates otherwise. In this document, each of phrases such as “A or B”, “at least one of A and B”, “at least one of A or B”, “A, B, or C”, “at least one of A, B and C”, and “at least one of A, B, or C” may include any one of, or all possible combinations of, items listed together in the corresponding one of the phrases. Terms such as “first” or “second” may be simply used for distinguishing a corresponding component from other corresponding components, and do not limit the corresponding components in other aspects (e.g., importance or order). In the case that one (e.g., first) component is referred to as “coupled” or “connected” to another (e.g., second) component, with or without the terms “functionally” or “communicatively, it means that the one component may be connected to the other component directly (e.g., by wire), wirelessly, or through a third component.

The term “module” used in various embodiments of this document may include a unit implemented in hardware, software, or firmware, and may be used interchangeably with terms such as, for example, logic, logic block, part, or circuit. A module may be an integrally formed part or a minimum unit or a portion of the part that performs one or more functions. For example, according to an embodiment, the module may be implemented in the form of an application-specific integrated circuit (ASIC).

Various embodiments of this document may be implemented into software including one or more instructions stored in a storage medium (e.g., the memory 14) readable by a machine (e.g., the electronic device 10). For example, the processor (e.g., the processor 13) of the device (e.g., the electronic device 10) may call and execute at least one command among one or more stored instructions from a storage medium. This makes it possible for the device to be operated to perform at least one function according to the called at least one instruction. The one or more instructions may include a code generated by a compiler or a code executable by an interpreter. The device readable storage medium may be provided in the form of a non-transitory storage medium. Here, ‘non-transitory’ only means that the storage medium is a tangible device and does not include a signal (e.g., electromagnetic wave), and this term does not distinguish the case that data is semi-permanently stored in the storage medium and the case that data is temporary stored.

According to an embodiment, a method according to various embodiments disclosed in this document may be provided as included in a computer program product. Computer program products may be traded between sellers and buyers as commodities. The computer program product may be distributed in the form of a machine readable storage medium (e.g., compact disc read only memory (CD-ROM)), or via an application store (e.g., Play Store™) or may be distributed (e.g., download or upload) online directly between two user devices (e g, smartphones). In the case of online distribution, at least a part of the computer program product may be at least temporarily stored or temporarily generated in a machine readable storage medium such as a memory of a server of a manufacturer, a server of an application store, or a relay server.

According to various embodiments, each component (e.g., module or program) of the above-described components may include a singular or a plurality of entities, and some of the plurality of entities may be separately disposed in other components. According to various embodiments, one or more components or operations among the above-described corresponding components may be omitted, or one or more other components or operations may be added. Alternatively or additionally, a plurality of components (e.g., module or program) may be integrated into one component. In this case, the integrated component may perform one or more functions of each component of the plurality of components identically or similarly to those performed by the corresponding component among the plurality of components prior to the integration. According to various embodiments, operations performed by a module, program, or other component may be executed sequentially, in parallel, repeatedly, or heuristically, or one or more of the operations may be executed in a different order, or omitted, or one or more other operations may be added.

Figure 2:
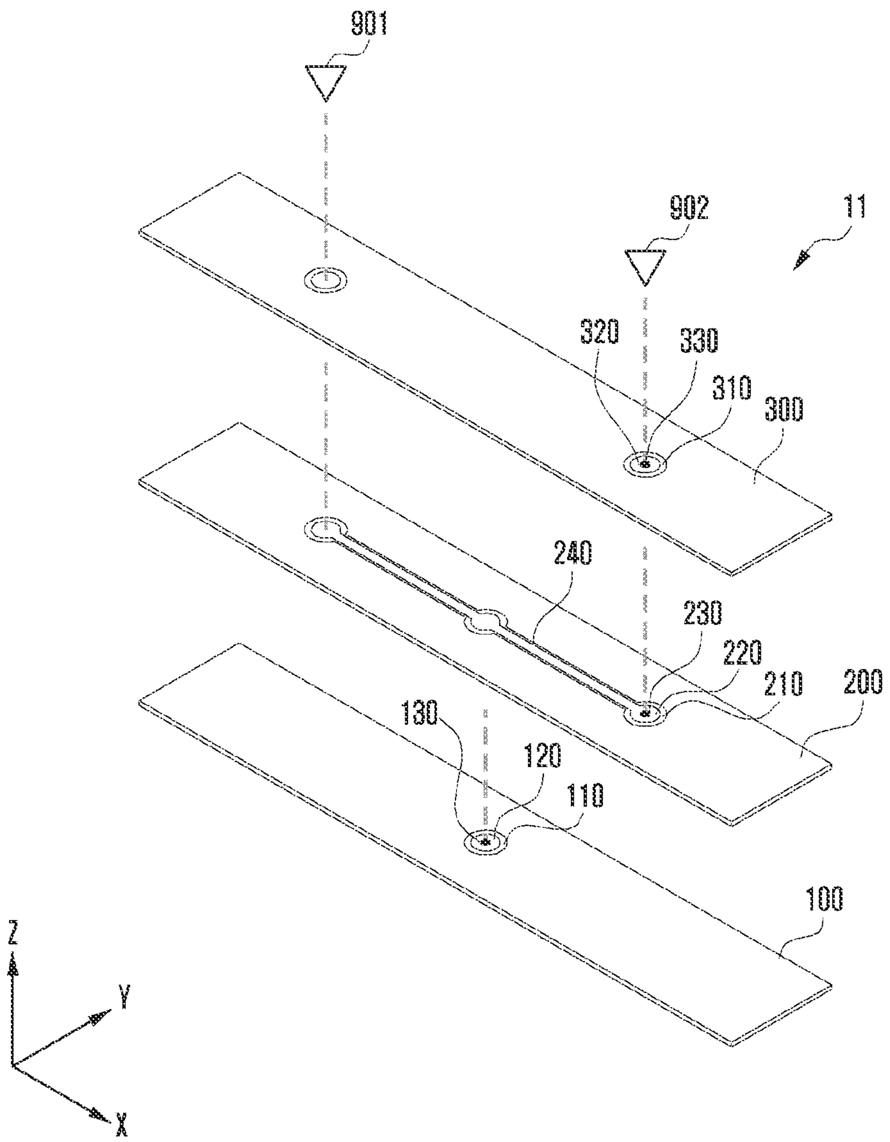
FIG. 2 is a conceptual diagram illustrating an antenna module 11 according to various embodiments.

FIG. 2 is a conceptual diagram illustrating an antenna module 11 according to various embodiments.

With reference to FIG. 2, the antenna module 11 may include a plurality of layers 100 to 300.

A first layer 100 may be referred to as a first isolation ground (GND) layer. For example, the first layer 100 may include a first etching area 110, a first via pad 120, and a first via hole 130.

A second layer 200 may be referred to as a first dividing line layer. The second layer 120 may be stacked on one surface of the first layer 100. The second layer 200 may include a second etching area 210, a second via pad 220, a second via hole 230, and a second dividing line 240.

A third layer 300 may be referred to as a second isolation ground layer. For example, the third layer 300 may include a third etching area 310, a third via pad 320, and a third via hole 330.

Figure 3:
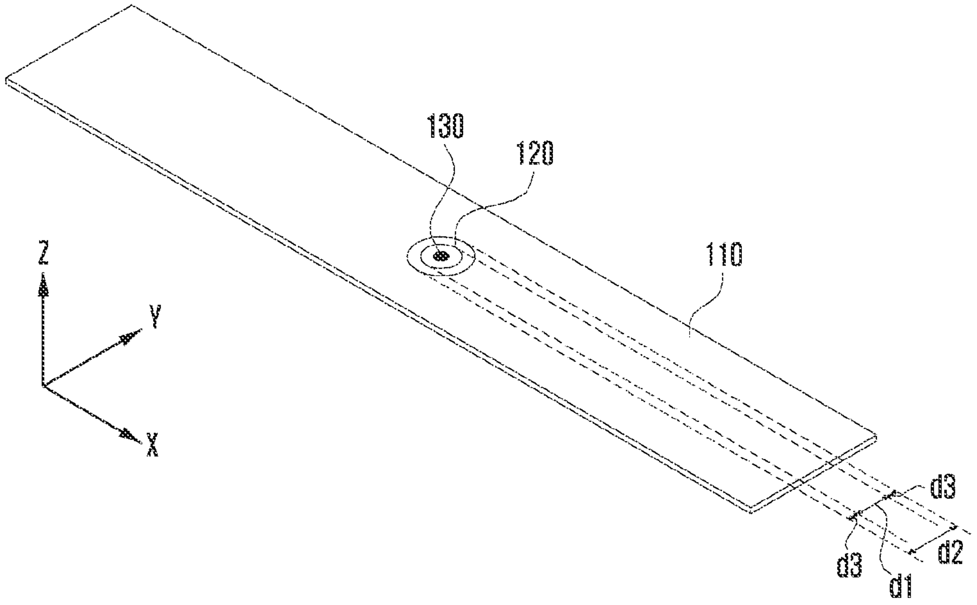
FIG. 3 is a conceptual diagram illustrating a first layer 100 of an antenna module 11 according to various embodiments.

For example, the first layer 100 may be the same as that illustrated in FIG. 3. The second layer 200 may be the same as that illustrated in FIG. 4. The third layer 300 may be the same as that illustrated in FIG. 5.

FIG. 3 is a conceptual diagram illustrating a first layer 100 of an antenna module 11 according to various embodiments.

With reference to FIG. 3, the first etching area 110 may be an etched portion of the first layer 100. For example, the first etching area 110 may be an area penetrating the first layer 100 in the z-axis direction.

The first via pad 120 may be disposed in the first etching area 110. A length of a width d1 of the first via pad 120 may be smaller than that of a width d2 of the first etching area 110. For example, the first via pad 120 may be spaced apart from an edge of the first etching area 110 by a predetermined distance d3.

The first via hole 130 may be disposed at one surface of the first via pad 120. A length of a width of the first via hole 130 may be smaller than that of the first via pad 120.

Figure 4:
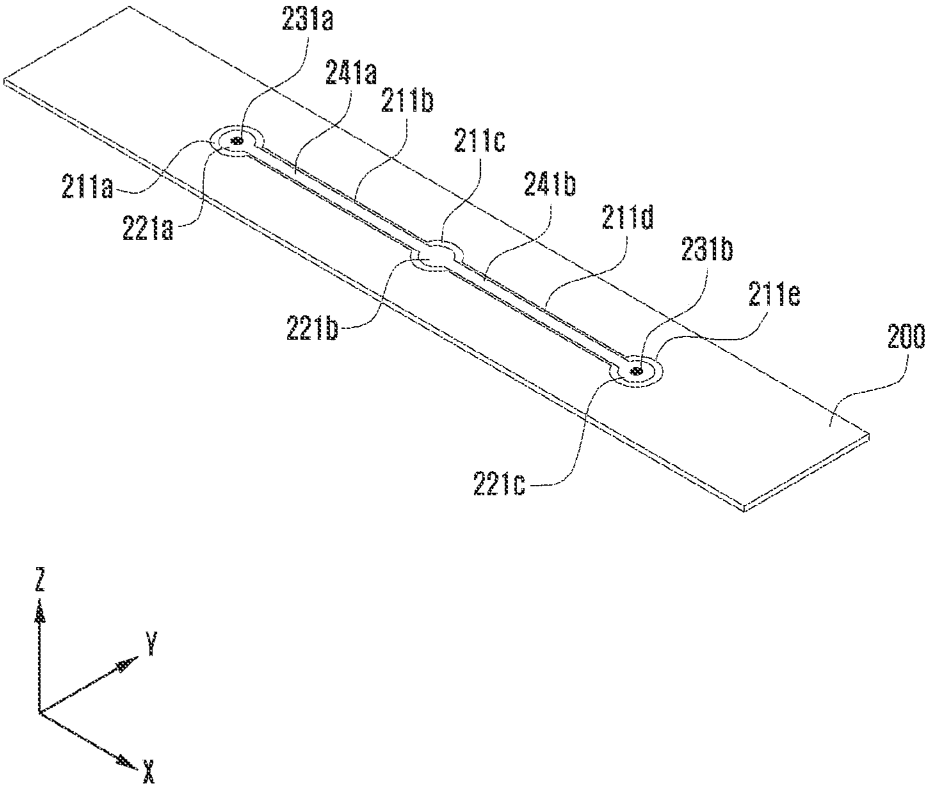
FIG. 4 is a conceptual diagram illustrating a second layer 200 of an antenna module 11 according to various embodiments.

FIG. 4 is a conceptual diagram illustrating a second layer 200 of an antenna module 11 according to various embodiments.

With reference to FIG. 4, the second etching area 210 may be an etched portion of the second layer 200. For example, the second etching area 210 may be an area penetrating the second layer 200 in the z-axis direction. For example, the second etching area 210 may include a 2a-th etching area 211*a*, a 2b-th etching area 211*b*, a 2c-th etching area 211*c*, a 2d-th etching area 211*d*, and a 2e-th etching area 211*e*.

The 2a-th etching area 211*a*, the 2c-th etching area 211*c*, and the 2e-th etching area 211*e* may be formed to be spaced apart from each other by a predetermined distance in the x-axis direction.

The 2b-th etching area 211*b* may be formed between the 2a-th etching area 211*a* and the 2c-th etching area 211*c*.

The 2d-th etching area 211*d* may be formed between the 2c-th etching area 211*c* and the 2e-th etching area 211*e*.

The second via pad 220 may be disposed in the second etching area 210. For example, the second via pad 220 may be spaced apart from an edge of the second etching area 210 by a predetermined distance.

For example, the second via pad 220 may include a 2a-th via pad 221*a*, a 2b-th via pad 221*b*, and a 2c-th via pad 221*c*. A length of a width of each of the second via pads 220 may be the same or similar.

The 2a-th via pad 221*a* may be disposed in the 2a-th etching area 211*a*. A length of a width of the 2a-th via pad 221*a* may be smaller than that of the 2a-th etching area 211*a*. For example, the 2a-th via pad 221*a* may be spaced apart from an edge of the 2a-th etching area 211*a* by a predetermined distance d3.

The 2b-th via pad 221*b* may be disposed in the 2c-th etching area 211*c*. A length of a width of the 2b-th via pad 221*b* may be smaller than that of the 2c-th etching area 211*c*. For example, the 2b-th via pad 221*b* may be spaced apart from an edge of the 2c-th etching area 211*c* by a predetermined distance d3. The 2b-th via pad 221*b* may be electrically connected to the first via hole 130. For example, one end of the first via hole 130 may be electrically connected to the other surface of the 2b-th via pad 221*b*.

The 2c-th via pad 221*c* may be disposed in the 2e-th etching area 211*e*. A length of a width of the 2c-th via pad 221*c* may be smaller than that of the 2e-th etching area 211*e*. For example, the 2c-th via pad 221*c* may be spaced apart from an edge of the 2e-th etching area 211*e* by a predetermined distance d3.

A length of a width of each of the second via holes 230 may be smaller than that of each of the via pads 220. The second via hole 230 may include a 2a-th via hole 231*a* and a 2b-th via hole 231*b*.

The 2a-th via hole 231*a* may be disposed at one surface of the 2a-th via pad 221*a*. A length of a width of the 2a-th via hole 231*a* may be smaller than that of the 2a-th via pad 221*a*.

The 2b-th via hole 231*b* may be disposed at one surface of the 2c-th via pad 221*c*. A length of a width of the 2b-th via hole 231*b* may be smaller than that of the 2c-th via pad 221*c*.

The second dividing line 240 may include a 2a-th dividing line 241*a* and a 2b-th dividing line 241*b*.

The 2a-th dividing line 241*a* may be disposed between the 2a-th via pad 221*a* and the 2b-th via pad 221*b*. For example, one end of the 2a-th dividing line 241*a* may be electrically connected to the 2a-th via pad 221*a*. The other end of the 2a-th dividing line 241*a* may be electrically connected to the 2b-th via pad 221*b*.

The 2a-th dividing line 241*a* may be disposed in the 2b-th etching area 211*b*. A length of a width of the 2a-th dividing line 241*a* may be smaller than that of the 2b-th etching area 211*b*. For example, the 2a-th dividing line 241*a* may be spaced apart from the 2b-th etching area 1211*b* by a predetermined distance.

The 2b-th dividing line 241*b* may be disposed between the 2b-th via pad 221*b* and the 2c-th via pad 221*c*. For example, one end of the 2b-th dividing line 241*b* may be electrically connected to the 2b-th via pad 221*b*. The other end of the 2b-th dividing line 241*a* may be electrically connected to the 2c-th via pad 221*c*.

The 2b-th dividing line 241*b* may be disposed in the 2d-th etching area 211*d*. A length of a width of the 2b-th dividing line 241*b* may be smaller than that of the 2d-th etching area 211*d*. For example, the 2b-th dividing line 241*b* may be spaced apart from the 2d-th etching area 211*d* by a predetermined distance.

Figure 5:
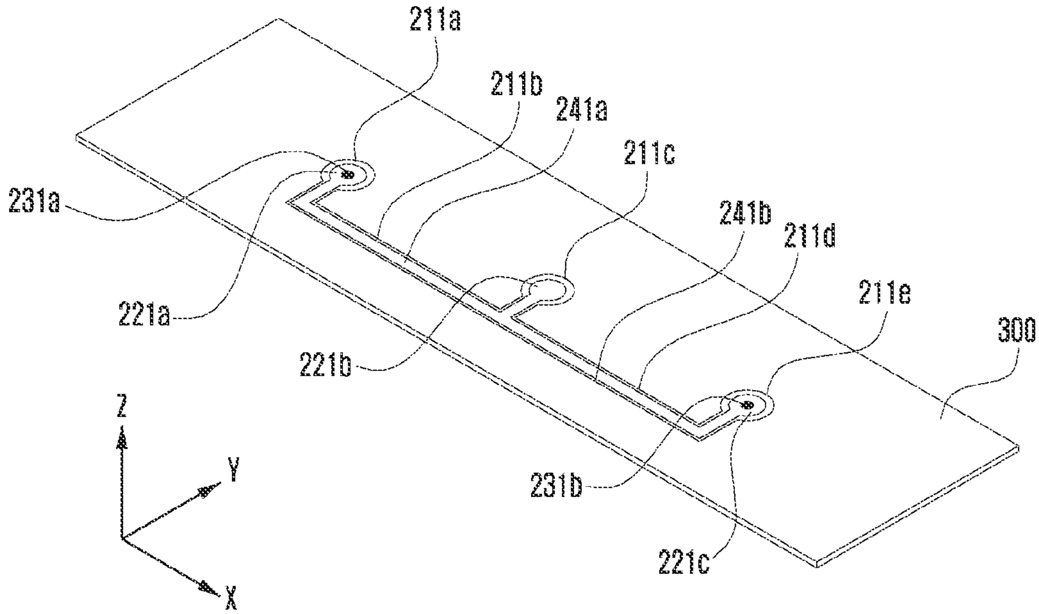
FIG. 5 is a conceptual diagram illustrating a y-axis cross-section of a layer including an etching area, a via pad, and a via hole of an antenna module 11 according to various embodiments.

FIG. 5 is a conceptual diagram illustrating a third layer 300 of an antenna module 11 according to various embodiments.

With reference to FIG. 5, the 2b-th etching area 211*b* and the 2d-th etching area 211*d* of the third layer 300 may have various shapes. For example, the 2b-th etching area 211*b* and the 2d-th etching area 211*d* may have an alphabet E shape. For example, the 2b-th etching area 211*b* may have a partial shape of the alphabet E and connect the 2a-th etching area 211*a* and the 2c-th etching area 211*c*. The 2d-th etching area 211*d* may have a partial shape of the alphabet E and connect the 2c-th etching area 211*c* and the 2e-th etching area 211*e*.

The second dividing line 240 of the third layer 300 may have various shapes. For example, the second dividing line 240 may have an alphabet E shape.

The 2a-th dividing line 241*a* may have a partial shape of the alphabet E and electrically connect the 2a-th via pad 221*a* and the 2b-th via pad 221*b*. For example, one end of the 2a-th dividing line 241*a* may be electrically connected to the 2a-th via pad 221*a*. The other end of the 2a-th dividing line 241*a* may be electrically connected to the 2b-th via pad 221*b*.

The 2a-th dividing line 241*a* may have a partial shape of the alphabet E and be disposed in the 2b-th etching area 211*b*. A length of a width of the 2a-th dividing line 241*a* may be smaller than that of the 2b-th etching area 211*b*. For example, the 2a-th dividing line 241*a* may be spaced apart from the 2b-th etching area 1211*b* by a predetermined distance.

The 2b-th dividing line 241*b* may have a partial shape of the alphabet E and electrically connect the 2b-th via pad 221*b* and the 2c-th via pad 221*c*. For example, one end of the 2b-th dividing line 241*b* may be electrically connected to the 2b-th via pad 221*b*. The other end of the 2b-th dividing line 241*a* may be electrically connected to the 2c-th via pad 221*c*.

The 2b-th dividing line 241*b* may have a partial shape of the alphabet E and be disposed in the 2d-th etching area 211*d*. A length of a width of the 2b-th dividing line 241*b* may be smaller than that of the 2d-th etching area 211*d*. For example, the 2b-th dividing line 241*b* may be spaced apart from the 2d-th etching area 211*d* by a predetermined distance.

Figure 6:
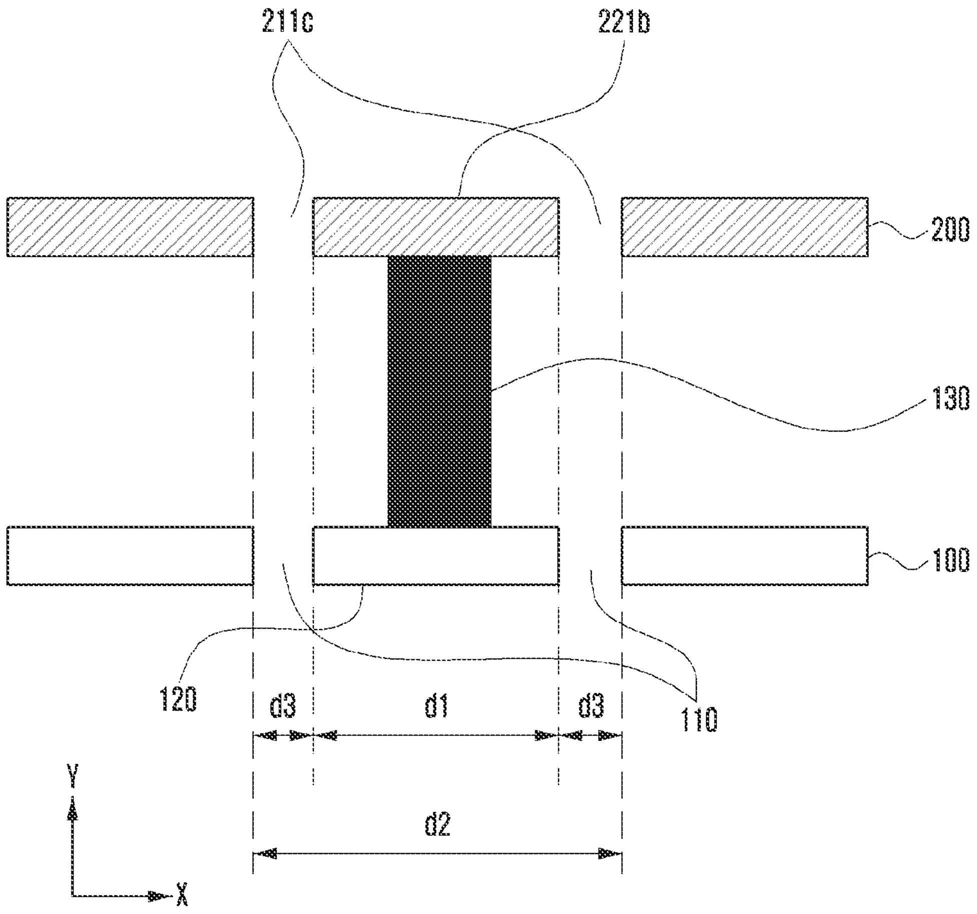
FIG. 6 is a conceptual diagram illustrating a third layer 300 of an antenna module 11 according to various embodiments.

FIG. 6 is a conceptual diagram illustrating a y-axis cross-section of a layer including an etching area, a via pad, and a via hole of an antenna module 11 according to various embodiments.

With reference to FIG. 6, the first via pad 120 may be disposed in the first etching area 110. A length of a width d1 of the first via pad 120 may be smaller than that of a width d2 of the first etching area 110. For example, the first via pad 120 may be spaced apart from an edge of the first etching area 110 by a predetermined distance d3.

The first via hole 130 may be disposed at one surface of the first via pad 120. A length of a width of the first via hole 130 may be smaller than that of the first via pad 120.

The 2b-th via pad 221*b* may be disposed in the 2c-th etching area 211*c*. A length of a width of the 2b-th via pad 221*b* may be smaller than that of the 2c-th etching area 211*c*. For example, the 2b-th via pad 221*b* may be spaced apart from an edge of the 2c-th etching area 211*c* by a predetermined distance d3. The 2b-th via pad 221*b* may be electrically connected to the first via hole 130. For example, one end of the first via hole 130 may be electrically connected to the other surface of the 2b-th via pad 221*b*.

FIG. 6 illustrates ay-axis cross section of a first via hole 130 among a plurality of via holes of the antenna module 11 for convenience of description, but the disclosure is not limited thereto, and a structure of FIG. 6 may be the same as or similar to that of at least one of the plurality of via holes of the antenna module 11 according to various embodiments to be described later.

FIG. 6 illustrates y-axis cross-sections of the first via pad 120 and the 2b-th via pad 221*b* connected to the first via hole 130 among a plurality of via pads of the antenna module 11 for convenience of description, but the disclosure is not limited thereto, and the structure of FIG. 6 may be the same as or similar to that of at least one of the plurality of via pads of the antenna module 11 according to various embodiments to be described later.

Figure 7:
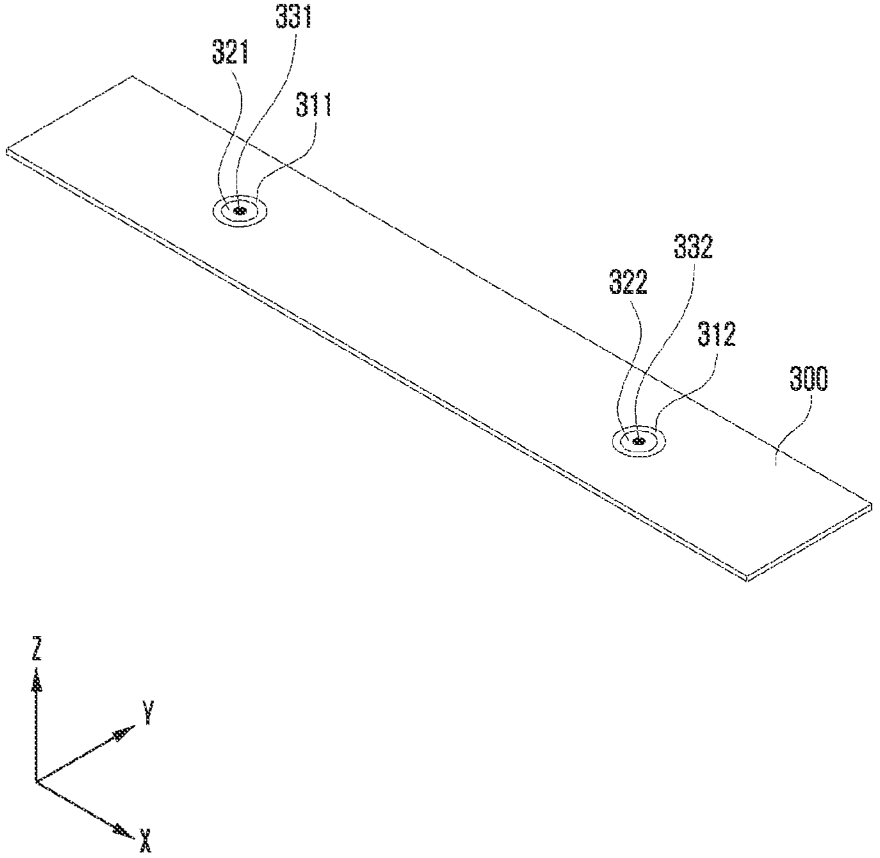
FIG. 7 is a conceptual diagram illustrating a third layer 300 of an antenna module 11 according to various embodiments.

FIG. 7 is a conceptual diagram illustrating a third layer 300 of an antenna module 11 according to various embodiments.

With reference to FIG. 7, the third etching area 310 may include a 3-1st etching area 311 and a 3-2nd etching area 312. The 3-1st etching area 311 and the 3-2nd etching area 312 may be spaced apart from each other by a predetermined distance in the x-axis direction on the third layer.

The 3-1st etching area 311 may be an etched portion of the third layer 300. For example, the 3-1st etching area 311 may be an area penetrating the third layer 300 in the z-axis direction.

The 3-2nd etching area 312 may be an etched portion of the third layer 300. For example, the 3-2nd etching area 312 may be an area penetrating the third layer 300 in the z-axis direction.

The third via pad 320 may include a 3-1st via pad 321 and a 3-2nd via pad 322. The 3-1st via pad 321 may be disposed in the 3-1st etching area 311. A length of a width of the 3-1st via pad 321 may be smaller than that of the 3-1st etching area 311. For example, the 3-1st via pad 321 may be spaced apart from an edge of the 3-1st etching area 311 by a predetermined distance. The 3-1st via pad 321 may be electrically connected to the 2a-th via hole 230*a*. For example, one end of the 2a-th via hole 230*a* may be electrically connected to the other surface of the 3-1st via pad 321.

The 3-2nd via pad 322 may be disposed in the 3-2nd etching area 312. A length of a width of the 3-2nd via pad 322 may be smaller than that of the 3-2nd etching area 312. For example, the 3-2nd via pad 322 may be spaced apart from an edge of the 3-2nd etching area 312 by a predetermined distance. The 3-2nd via pad 322 may be electrically connected to the 2b-th via hole 230*b*. For example, one end of the 2b-th via hole 230*b* may be electrically connected to the other surface of the 3-2nd via pad 322.

The plurality of third via holes 330 may include a 3-1st via hole 331 and a 3-2nd via hole 332.

The 3-1st via hole 331 may be disposed at one surface of the 3-1st via pad 321. A length of a width of the 3-1st via hole 331 may be smaller than that of the 3-1st via pad 321.

The 3-2nd via hole 332 may be disposed at one surface of the 3-2nd via pad 322. A length of a width of the 3-2nd via hole 332 may be smaller than that of the 3-2nd via pad 322.

A plurality of antennas 901 and 902 may be electrically connected to the third via pad 320. For example, a first antenna 901 may be electrically connected to one surface of the 3-1st via pad 321. A second antenna 902 may be electrically connected to one surface of the 3-2nd via pad 322.

The first via pad 120 may receive a signal input from the communication module 12. A signal input through the first via pad 120 may be transmitted to the second via pad 220 through the first via hole 130.

For example, a signal input through the first via pad 120 may be transmitted to the 2b-th via pad 221*b* through the first via hole 130. A signal transmitted to the 2b-th via pad 221*b* may be distributed to the 2a-th dividing line 241*a* and the 2b-th dividing line 241*b*. For example, a signal transmitted to the 2b-th via pad 221*b* may be transmitted to the 2a-th via pad 221*a* through the 2a-th dividing line 241*a*. A signal transmitted to the 2b-th via pad 221*b* may be transmitted to the 2c-th via pad 221*c* through the 2b-th dividing line 241*b*.

A signal transmitted to the 2a-th via pad 221*a* may be transmitted to the 3-1st via pad 321 through the 2a-th via hole 231*a*. A signal transmitted to the 2b-th via pad 221*b* may be transmitted to the 3-2nd via pad 322 through the 2c-th via hole 231*c*.

A signal transmitted to the 3-1st via pad 321 may be transmitted to the first antenna 901. A signal transmitted to the 3-2nd via pad 322 may be transmitted to the second antenna 902.

The first antenna 901 may radiate a signal received from the 3-1st via pad 321. The second antenna 902 may radiate a signal received from the 3-2nd via pad 322.

Figure 8:
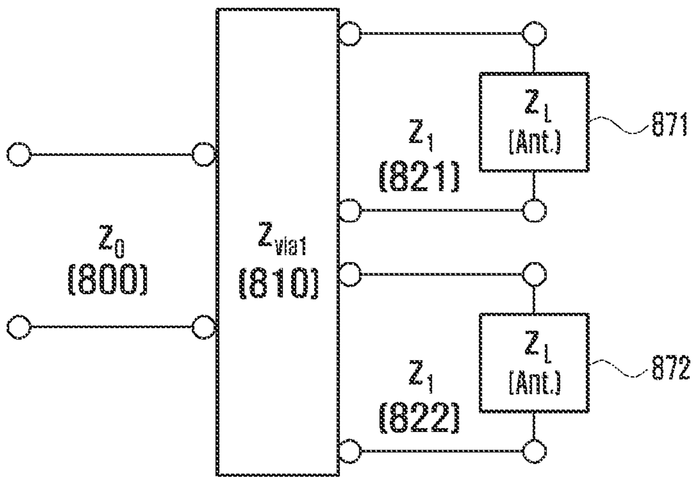
FIG. 8 is a conceptual diagram illustrating impedance of an antenna module 11 according to various embodiments.

The impedance of the antenna module 11 according to the flow of the signal may be the same as that of FIG. 8.

FIG. 8 is a conceptual diagram illustrating impedance of an antenna module 11 according to various embodiments.

With reference to FIG. 8, in the antenna module 11, zero impedance Z0, 800, first via impedance Zvia1, 810, first dividing impedance Z1, 821 and 822, antenna impedance ZL(Ant), 871 and 872 may be generated. The first dividing impedance Z1, 821 and 822 may include 1-1st dividing impedance Z1, 821 and 1-2nd dividing impedance Z1, 822. The antenna impedance ZL(Ant), 871 and 872 may include first antenna impedance ZL(Ant), 871 and second antenna impedance ZL(Ant), 872.

For example, the zero impedance Z0, 800 may be generated in a conductive line in which a signal flows between the first via pad 120 and the communication module 12.

The first via impedance Zvia1, 810 may be generated in the first via hole 130. The first via hole 130 may have first via impedance Zvia1, 810.

The 1-1st dividing impedance Z1, 821 may be generated in the 2a-th dividing line 241*a*. The 2a-th dividing line 241*a* may have 1-1st dividing impedance Z1, 821.

The 1-2nd dividing impedance Z1, 822 may be generated in the 2b-th dividing line 241*b*. The 2b-th dividing line 241*b* may have 1-2nd dividing impedance Z1, 822.

The first antenna impedance ZL(Ant.1) 871 may be generated in a conductive line in which a signal flows from the 2a-th via hole 231*a* to the first antenna 901.

The second antenna impedance ZL(Ant.2) 872 may be generated in a conductive line in which a signal flows from the 2c-th via hole 231*c* to the second antenna 902.

The first via impedance Zvia1, 810 may be determined based on at least one of the 1-1st dividing impedance Z1, 821, the 1-2nd dividing impedance Z1, 822, the first antenna impedance ZL(Ant.1) 871, the second antenna impedance ZL(Ant.2) 872, a distance of a conductive line in which the first antenna impedance ZL(Ant.1) 871 is generated, and a distance of a conductive line in which the second antenna impedance ZL(Ant. 2)) 872 is generated.

The first via impedance Zvia1, 810 may be determined based on a separation distance d3 between edges of the first via pad 120 and the first etching area 110.

The first via impedance Zvia1, 810 may be determined based on a separation distance d3 between edges of the 2c-th via pad 221*c* and the 2e-th etching area 211*e*.

The first via impedance Zvia1, 810 may be determined based on at least one of a separation distance d3 between edges of the first via pad 120 and the first etching area 110, and a separation distance d3 between edges of the 2c-th via pad 221*c* and the 2e-th etching area 211*e*.

The separation distance d3 between edges of the first via pad 120 and the first etching area 110 and the separation distance d3 between edges of the 2c-th via pad 221*c* and the 2e-th etching area 211*e* may be the same or different.

Figure 9:
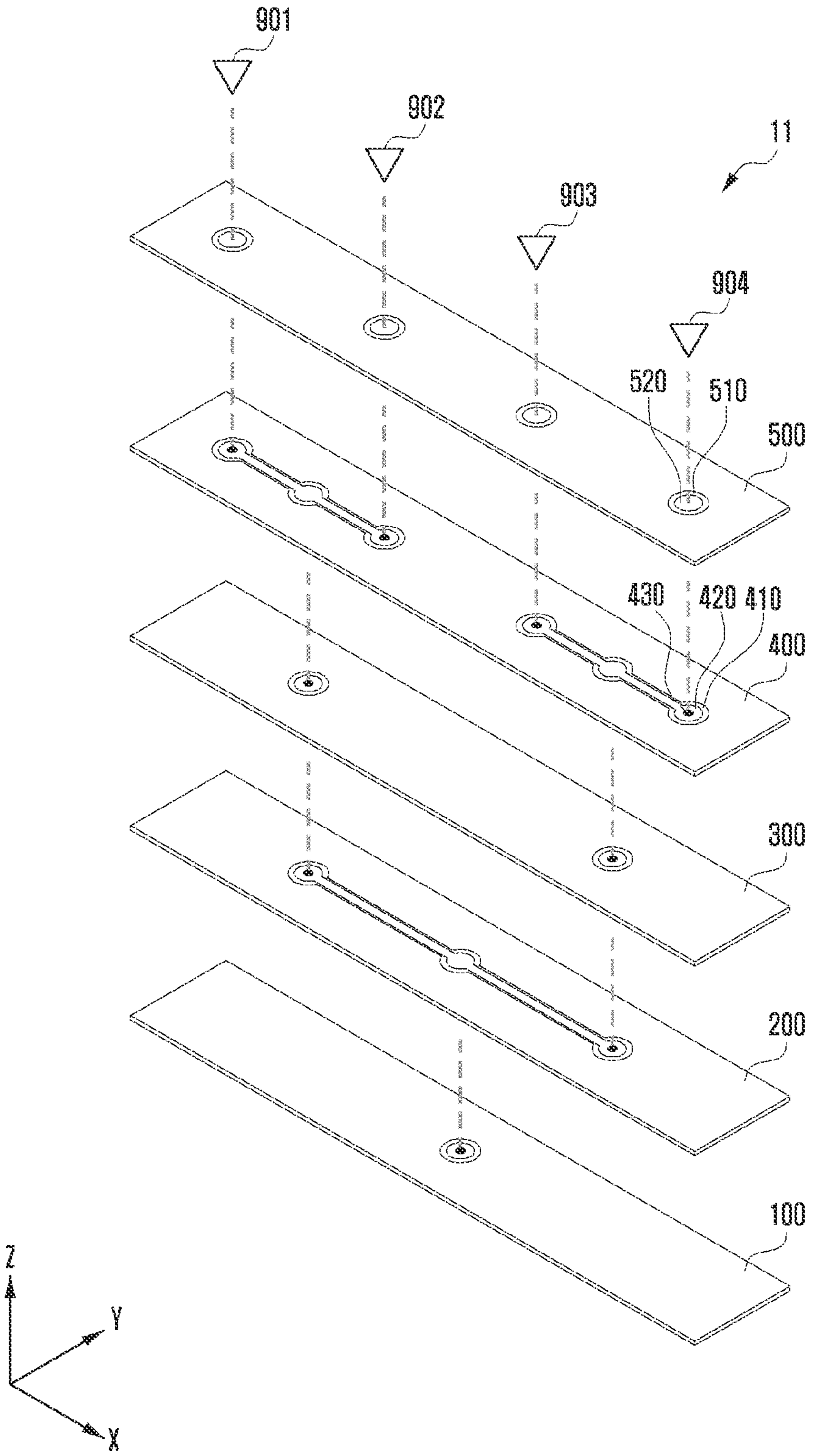
FIG. 9 is a conceptual diagram illustrating an antenna module 11 according to various embodiments.

FIG. 9 is a conceptual diagram illustrating an antenna module 11 according to various embodiments.

With reference to FIG. 9, the antenna module 11 may further include a fourth layer 400 and a fifth layer 500. For example, the fourth layer 400 may be stacked on one surface of the third layer 300 in the y-axis direction.

The fourth layer 400 may be referred to as a second dividing line layer. The fourth layer 400 may include a fourth etching area 410, a fourth via pad 420, a fourth via hole 430, and a fourth dividing line 440.

The fifth layer 500 may be referred to as an antenna ground layer. The fifth layer 500 may include a fifth etching area 510 and a fifth via pad 520.

Figure 10:
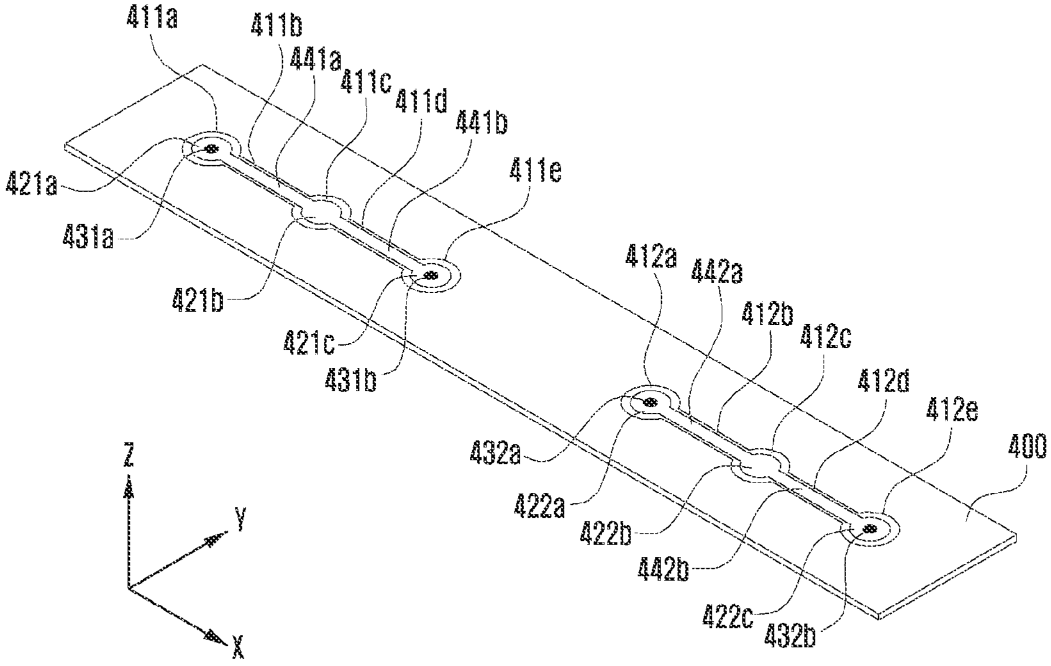
FIG. 10 is a conceptual diagram illustrating a fourth layer 400 of an antenna module 11 according to various embodiments.

For example, the fourth layer 400 may be the same as that illustrated in FIG. 10. The fifth layer 500 may be the same as that illustrated in FIG. 11.

FIG. 10 is a conceptual diagram illustrating a fourth layer 400 of an antenna module 11 according to various embodiments.

With reference to FIG. 10, a fourth etching area 410 may be etched portions of the fourth layer 400. For example, the fourth etching area 410 may be areas penetrating the fourth layer 400 in the z-axis direction.

The fourth etching area 410 may include a 4-1st etching area 411 and a 4-2nd etching area 412. The 4-1st etching area 411 and the 4-2nd etching area 412 may be formed to be spaced apart from each other by a predetermined distance in the x-axis direction on the fourth layer 400.

The 4-1st etching area 411 may include a 4-1a-th etching area 411*a*, a 4-1b-th etching area 411*b*, a 4-1c-th etching area 411*c*, a 4-1d-th etching area 411*d*, and a 4-1e-th etching area 411*e*.

The 4-1a-th etching area 411*a*, the 4-1c-th etching area 411*c*, and the 4-1e-th etching area 411*e* may be formed to be spaced apart from each other by a predetermined distance in the x-axis direction on the fourth layer.

The 4-1b-th etching area 411*b* may be formed between the 4-1a-th etching area 411*a* and the 4-1c-th etching area 411*c*.

The 4-1d-th etching area 411*d* may be formed between the 4-1c-th etching area 411*c* and the 4-1e-th etching area 411*e*.

The 4-2th etching area 412 may include a 4-2a-th etching area 412*a*, a 4-2b-th etching area 412*b*, a 4-2c-th etching area 412*c*, a 4-2d-th etching area 412*d*, and a 4-2e-th etching area 412*e*.

The 4-2a-th etching area 412*a*, the 4-2c-th etching area 412*c*, and the 4-2e-th etching area 412*e* may be formed to be spaced apart from each other by a predetermined distance in the x-axis direction on the fourth layer.

The 4-2b-th etching area 412*b* may be formed between the 4-2a-th etching area 412*a* and the 4-2c-th etching area 412*c*.

The 4-2d-th etching area 412*d* may be formed between the 4-2c-th etching area 412*c* and the 4-2e-th etching area 412*e*.

The fourth via pad 420 may include a 4-1st via pad 1421 and a 4-2nd via pad 1422.

The 4-1st via pad 421 may be disposed in the 4-1st etching area 411. For example, the 4-1st via pad 421 may be spaced apart from an edge of the 4-1st etching area 411 by a predetermined distance.

The 4-2nd via pad 422 may be disposed in the 4-2nd etching area 412. For example, the 4-2nd via pad 422 may be spaced apart from an edge of the 4-2nd etching area 412 by a predetermined distance d.

The 4-1th via pad 421 may include a 4-1a-th via pad 421*a*, a 4-1b-th via pad 421*b*, and a 4-1c-th via pad 421*c*. A length of a width of each of the 4-1st via pads 421 may be the same or similar.

For example, the 4-1a-th via pad 421*a* may be disposed in the 4-1a-th etching area 411*a*. A length of a width of the 4-1a-th via pad 421*a* may be smaller than that of the 4-1a-th etching area 411*a*. For example, the 4-1a-th via pad 421*a* may be spaced apart from an edge of the 4-1a-th etching area 411*a* by a predetermined distance.

The 4-1b-th via pad 421*b* may be disposed in the 4-1c-th etching area 411*c*. A length of a width of the 4-1b-th via pad 421*b* may be smaller than that of the 4-1c-th etching area 411*c*. For example, the 4-1b-th via pad 421*b* may be spaced apart from an edge of the 4-1c-th etching area 411*c* by a predetermined distance. The 4-1b-th via pad 421*b* may be electrically connected to the 3-1st via hole 331. For example, one end of the 3-1st via hole 331 may be electrically connected to the other surface of the 4-1b-th via pad 421*b*.

The 4-1e-th via pad 421*c* may be disposed in the 4-1e-th etching area 411*e*. A length of a width of the 4-1c-th via pad 421*c* may be smaller than that of the 4-1e-th etching area 411*e*. For example, the 4-1c-th via pad 421*c* may be spaced apart from an edge of the 4-1e-th etching area 411*e* by a predetermined distance.

The 4-2nd via pad 422 may include a 4-2a-th via pad 422*a*, a 4-2b-th via pad 422*b*, and a 4-2c-th via pad 422*c*. A length of a width of each of the plurality of 4-2nd via pads 422 may be the same or similar.

For example, the 4-2a-th via pad 422*a* may be disposed in the 4-2a-th etching area 412*a*. A length of a width of the 4-2a-th via pad 422*a* may be smaller than that of the 4-2a-th etching area 412*a*. For example, the 4-2a-th via pad 422*a* may be spaced apart from an edge of the 4-2a-th etching area 412*a* by a predetermined distance.

The 4-2b-th via pad 422*b* may be disposed in the 4-2c-th etching area 412*c*. A length of a width of the 4-2b-th via pad 422*b* may be smaller than that of the 4-2c-th etching area 412*c*. For example, the 4-2b-th via pad 422*b* may be spaced apart from an edge of the 4-2c-th etching area 412*c* by a predetermined distance. The 4-2b-th via pad 422*b* may be electrically connected to the 3-2nd via hole 332. For example, one end of the 3-2nd via hole 332 may be electrically connected to the other surface of the 4-2b-th via pad 422*b*.

The 4-2c-th via pad 422*c* may be disposed in the 4-2e-th etching area 412*e*. A length of a width of the 4-2c-th via pad 422*c* may be smaller than that of the 4-2e-th etching area

412*e* For example, the 4-2c-th via pad 422*c* may be spaced apart from an edge of the 4-2e-th etching area 412*e* by a predetermined distance.

A length of a width of each of the fourth via holes 430 may be smaller than that of each of the fourth via pads 420. The fourth via hole 430 may include a 4-1a-th via hole 431*a*, a 4-1b via hole 431*b*, a 4-2a-th via hole 432*a*, and a 4-2b-th via hole 432*b*.

The 4-1a-th via hole 431*a* may be disposed at one surface of the 4-1a-th via pad 421*a*. A length of a width of the 4-1a-th via hole 431*a* may be smaller than that of the 4-1a-th via pad 421*a*.

The 4-1b via hole 431*b* may be disposed at one surface of the 4-1c-th via pad 421*c*. A length of a width of the 4-1b via hole 431*b* may be smaller than that of the 4-1c-th via pad 421*c*.

The 4-2a-th via hole 432*a* may be disposed at one surface of the 4-2a-th via pad 422*a*. A length of a width of the 4-2a-th via hole 432*a* may be smaller than that of the 4-2a-th via pad 422*a*.

The 4-2b-th via hole 432*b* may be disposed at one surface of the 4-2c-th via pad 422*c* A length of a width of the 4-2b-th via hole 432*b* may be smaller than that of the 4-2c-th via pad 422*c*.

The fourth dividing line 440 may include a 4-1a-th dividing line 441*a*, a 4-1b-th dividing line 441*b*, a 4-2a-th dividing line 442*a*, and a 4-2b-th dividing line 442*b*.

The 4-1a-th dividing line 441*a* may be disposed between the 4-1a-th via pad 421*a* and the 4-1b-th via pad 421*b*. For example, one end of the 4-1a-th dividing line 441*a* may be electrically connected to the 4-1a-th via pad 421*a*. The other end of the 4-1a-th dividing line 441*a* may be electrically connected to the 4-1b-th via pad 421*b*.

The 4-1a-th dividing line 441*a* may be disposed in the 4-1b-th etching area 411*b*. A length of a width of the 4-1a-th dividing line 441*a* may be smaller than that of the 4-1b-th etching area 411*b*. For example, the 4-1a-th dividing line 441*a* may be spaced apart from the 4-1b-th etching area 411*b* by a predetermined distance.

The 4-1b-th dividing line 441*b* may be disposed between the 4-1b-th via pad 421*b* and the 4-1c-th via pad 421*c*. For example, one end of the 4-1b-th dividing line 441*b* may be electrically connected to the 4-1b-th via pad 421*b*. The other end of the 4-1b-th dividing line 4411*b* may be electrically connected to the 4-1c-th via pad 421*c*.

The 4-1b-th dividing line 441*b* may be disposed in the 4-1d-th etching area 411*d*. A length of a width of the 4-1b-th dividing line 441*b* may be smaller than that of the 4-1d-th etching area 411*d*. For example, the 4-1b-th dividing line 441*b* may be spaced apart from the 4-1d-th etching area 411*d* by a predetermined distance.

The 4-2a-th dividing line 442*a* may be disposed between the 4-2a-th via pad 422*a* and the 4-2b-th via pad 422*b*. For example, one end of the 4-2a-th dividing line 442*a* may be electrically connected to the 4-2a-th via pad 422*a*. The other end of the 4-2a-th dividing line 442*a* may be electrically connected to the 4-2b-th via pad 422*b*.

The 4-2a-th dividing line 442*a* may be disposed in the 4-2b-th etching area 412*b* A length of a width of the 4-2a-th dividing line 442*a* may be smaller than that of the 4-2b-th etching area 412*b*. For example, the 4-2a-th dividing line 442*a* may be spaced apart from the 4-2b-th etching area 412*b* by a predetermined distance.

The 4-2b-th dividing line 442*b* may be disposed between the 4-2b-th via pad 422*b* and the 4-2c-th via pad 422*c*. For example, one end of the 4-2b-th dividing line 442*b* may be electrically connected to the 4-2b-th via pad 422*b*. The other end of the 4-2b-th dividing line 442*b* may be electrically connected to the 4-2c-th via pad 422*c*.

The 4-2b-th dividing line 442*b* may be disposed in the 4-2d-th etching area 412*d* A length of a width of the 4-2b-th dividing line 442*b* may be smaller than that of the 4-2d-th etching area 412*d*. For example, the 4-2b-th dividing line 442*b* may be spaced apart from the 4-2d-th etching area 412*d* by a predetermined distance.

Figure 11:
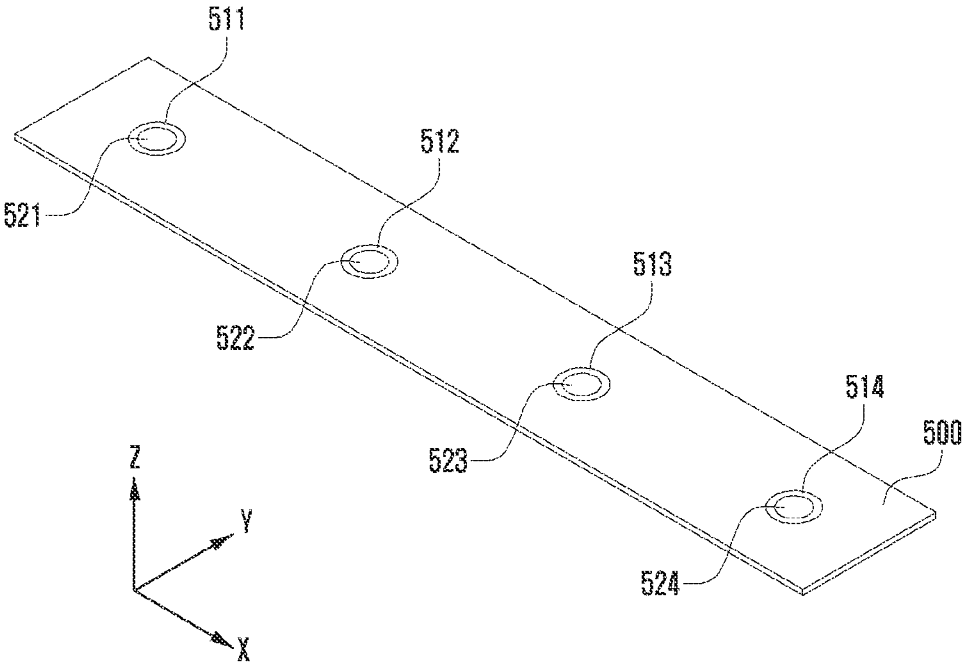
FIG. 11 is a conceptual diagram illustrating a fifth layer 500 of an antenna module 11 according to various embodiments.

FIG. 11 is a conceptual diagram illustrating a fifth layer 500 of an antenna module 11 according to various embodiments.

With reference to FIG. 11, a fifth etching area 510 may include a 5-1st etching area 511, a 5-2nd etching area 512, a 5-3rd etching area 513, and a 5-4th etching area 514.

The 5-1st etching area 511, the 5-2nd etching area 512, the 5-3rd etching area 513, and the 5-4th etching area 514 may be formed to be spaced apart from each other by a predetermined distance in the x-axis direction on the fifth layer 500.

The 5-1st etching area 511 may be an etched portion of the fifth layer 500. For example, the 5-1st etching area 511 may be an area penetrating the fifth layer 500 in the z-axis direction.

The 5-2nd etching area 512 may be an etched portion of the fifth layer 500. For example, the 5-2nd etching area 512 may be an area penetrating the fifth layer 500 in the z-axis direction.

The 5-3rd etching area 513 may be an etched portion of the fifth layer 500. For example, the 5-3rd etching area 513 may be an area penetrating the fifth layer 500 in the z-axis direction.

The 5-4th etching area 514 may be an etched portion of the fifth layer 500. For example, the 5-4th etching area 514 may be an area penetrating the fifth layer 500 in the z-axis direction.

The plurality of fifth via pads 520 may include a 5-1st via pad 521, a 5-2nd via pad 522, a 5-3rd via pad 523, and a 5-4th via pad 524.

The 5-1st via pad 521 may be disposed in the 5-1st etching area 511. A length of a width of the 5-1st via pad 521 may be smaller than that of the 5-1st etching area 511. For example, the 5-1st via pad 521 may be spaced apart from an edge of the 5-1st etching area 511 by a predetermined distance. The 5-1st via pad 521 may be electrically connected to the 4-1a-th via hole 431*a*. For example, one end of the 4-1a-th via hole 431*a* may be electrically connected to the other surface of the 5-1st via pad 521.

The 5-2nd via pad 522 may be disposed in the 5-2nd etching area 512. A length of a width of the 5-2nd via pad 522 may be smaller than that of the 5-2nd etching area 512. For example, the 5-2nd via pad 522 may be spaced apart from an edge of the 5-2nd etching area 512 by a predetermined distance. The 5-2nd via pad 522 may be electrically connected to the 4-1b via hole 431*b*. For example, one end of the 4-1b via hole 431*b* may be electrically connected to the other surface of the 5-2nd via pad 522.

The 5-3rd via pad 523 may be disposed in the 5-3rd etching area 513. A length of a width of the 5-3rd via pad 523 may be smaller than that of the 5-3rd etching area 513. For example, the 5-3rd via pad 523 may be spaced apart from an edge of the 5-3rd etching area 513 by a predetermined distance. The 5-3rd via pad 523 may be electrically connected to the 4-2a-th via hole 432*a*. For example, one end of the 4-2a-th via hole 432*a* may be electrically connected to the other surface of the 5-3rd via pad 523.

The 5-4th via pad 524 may be disposed in the 5-4th etching area 514. A length of a width of the 5-4th via pad 524 may be smaller than that of the 5-4th etching area 514. For example, the 5-4th via pad 524 may be spaced apart from an edge of the 5-4th etching area 514 by a predetermined distance. The 5-4th via pad 524 may be electrically connected to the 4-2b-th via hole 432*b*. For example, one end of the 4-2b-th via hole 432*b* may be electrically connected to the other surface of the 5-4th via pad 524.

The plurality of antennas 901 to 904 may be electrically connected to the plurality of fifth via pads 520. For example, the first antenna 901 may be electrically connected to one surface of the 5-1st via pad 521. The second antenna 902 may be electrically connected to one surface of the 5-2nd via pad 522. The third antenna 903 may be electrically connected to one surface of the 5-3rd via pad 523. The fourth antenna 904 may be electrically connected to one surface of the 5-4th via pad 524.

A signal transmitted to the 3-1st via pad 321 may be transmitted to the 4-1st via pad 421 through the 3-1st via hole 331. For example, a signal transmitted to the 3-1st via pad 321 may be transmitted to the 4-1c-th via pad 421*c* through the 3-1st via hole 331.

A signal transmitted to the 4-1c-th via pad 421*c* may be distributed to the 4-1a-th dividing line 441*a* and the 4-1b-th dividing line 441*b* For example, a signal transmitted to the 4-1c-th via pad 421*c* may be transmitted to the 4-1a-th via pad 421*a* through the 4-1a-th dividing line 441*a*. A signal transmitted to the 4-1c-th via pad 421*c* may be transmitted to the 4-1c-th via pad 421*c* through the 4-1b-th dividing line 441*b*.

A signal transmitted to the 4-1a-th via pad 421*a* may be transmitted to the 5-1a-th via pad 521 through the 4-1a-th via hole 431*a*. A signal transmitted to the 4-1b-th via pad 421*b* may be transmitted to the 5-2nd via pad 522 through the 4-1c-th via hole 431*c*.

A signal transmitted to the 5-1st via pad 521 may be transmitted to the first antenna 901. A signal transmitted to the 5-2nd via pad 522 may be transmitted to the second antenna 902.

The first antenna 901 may radiate a signal received from the 5-1st via pad 521. The second antenna 902 may radiate a signal received from the 5-2nd via pad 522.

A signal transmitted to the 3-2nd via pad 322 may be transmitted to the 4-2nd via pad 422 through the 3-2nd via hole 332. For example, a signal transmitted to the 3-2nd via pad 322 may be transmitted to the 4-2c-th via pad 422*c* through the 3-2nd via hole 332.

A signal transmitted to the 4-2c-th via pad 422*c* may be distributed to the 4-2a-th dividing line 442*a* and the 4-2b-th dividing line 442*b*. For example, a signal transmitted to the 4-2c-th via pad 422*c* may be transmitted to the 4-2a-th via pad 422*a* through the 4-2a-th dividing line 442*a*. A signal transmitted to the 4-2c-th via pad 422*c* may be transmitted to the 4-2c-th via pad 422*c* through the 4-2b-th dividing line 442*b*.

A signal transmitted to the 4-2a-th via pad 422*a* may be transmitted to the 5-2nd via pad 522 through the 4-2a-th via hole 432*a*. A signal transmitted to the 4-2b-th via pad 422*b* may be transmitted to the 5-3rd via pad 523 through the 4-2c-th via hole 432*c*.

A signal transmitted to the 5-3rd via pad 523 may be transmitted to the third antenna 903. A signal transmitted to the 5-4th via pad 524 may be transmitted to the fourth antenna 904.

The third antenna 903 may radiate a signal received from the 5-3rd via pad 523. The fourth antenna 904 may radiate a signal received from the 5-4th via pad 524.

Figure 12:
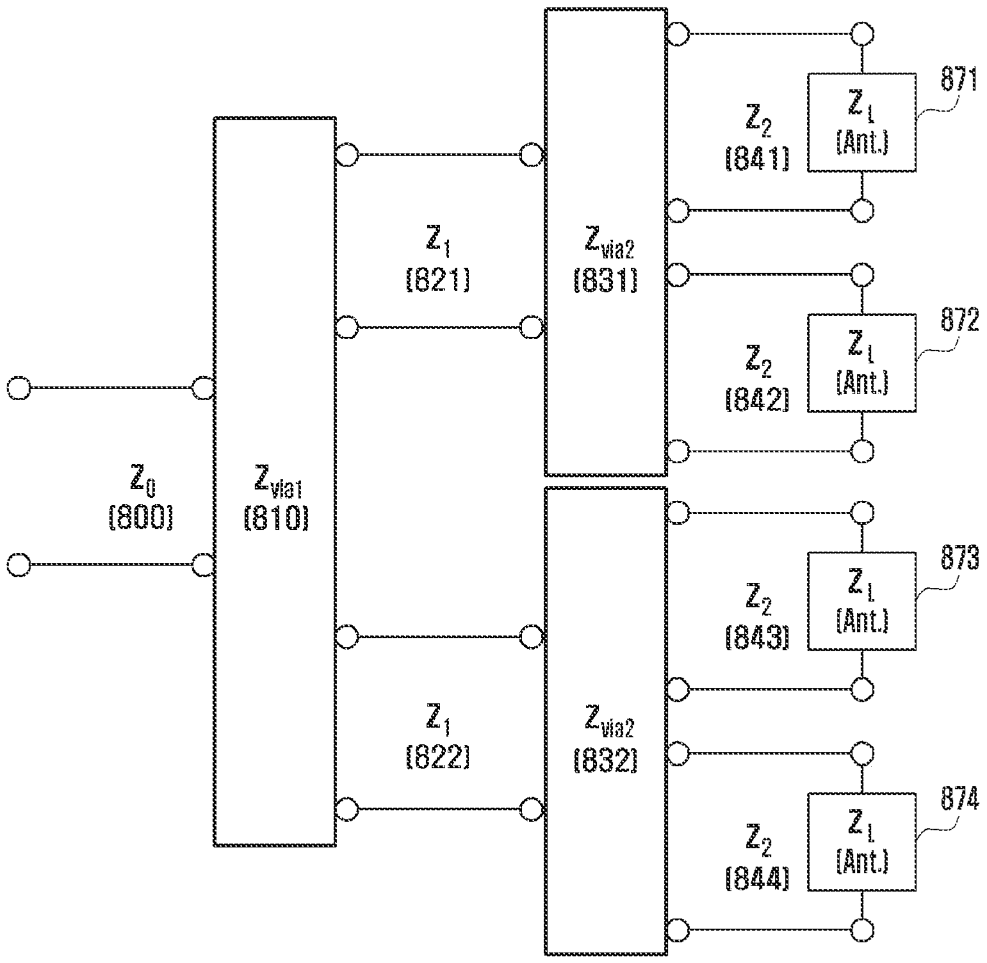
FIG. 12 is a conceptual diagram illustrating impedance of an antenna module 11 according to various embodiments.

The impedance of the antenna module 11 according to the signal flow may be the same as that illustrated in FIG. 12.

FIG. 12 is a conceptual diagram illustrating impedance of an antenna module 11 according to various embodiments.

With reference to FIG. 12, in the antenna module 11, zero impedance Z0, 800, first via impedance Zvia1, 810, first dividing impedance Z1, 821 and 822, second via impedance Zvia1, 831 and 832, second dividing impedance Z2, 841 to 844, and antenna impedance ZL(Ant), 871 to 874 may be generated.

The second via impedance Zvia1, 831 and 832 may include 2-1st via impedance Zvia2, 831 and 2-2nd via impedance Zvia2, 832.

The second dividing impedance Z2, 841 to 844 may include 2-1st dividing impedance Z2, 841 and 2-2nd dividing impedance Z2, 842.

The antenna impedance ZL(Ant), 871 to 874 may include first antenna impedance ZL(Ant), 871, second antenna impedance ZL(Ant), 872, third antenna impedance ZL(Ant), 873, and fourth antenna impedance ZL(Ant), 874.

The 2-1st via impedance Zvia2, 831 may be generated in the 2-1st via hole 221*a* and the 3-1st via hole 321. The 2a-th via hole 221*a* and the 3-1st via hole 321 may have 2-1st via impedance Zvia2, 831.

The 2-2nd via impedance Zvia2, 832 may be generated in the 2c-th via hole 221*c* and the 3-2nd via hole 322. The 2c-th via hole 221*c* and the 3-2nd via hole 322 may have 2-2nd via impedance Zvia2, 832.

The 2-1st dividing impedance Z2, 841 may be generated in the 4-1a-th dividing line 441*a*. The 4-1a-th dividing line 441*a* may have 2-1st dividing impedance Z2, 841.

The 2-2nd dividing impedance Z2, 842 may be generated in the 4-1b-th dividing line 441*b*. The 4-1b-th dividing line 441*b* may have 2-2nd dividing impedance Z2, 842.

The 2-3rd dividing impedance Z2, 843 may be generated in the 4-2a-th dividing line 442*a*. The 4-2a-th dividing line 442*a* may have 2-3rd dividing impedance Z2, 843.

The 2-4th dividing impedance Z2, 844 may be generated in the 4-2b-th dividing line 442*b*. The 4-2b-th dividing line 442*b* may have 2-4th dividing impedance Z2, 844.

The first antenna impedance ZL(Ant), 871 may be generated in a conductive line in which a signal flows from the 4-1a-th via hole 431*a* to the first antenna 901.

The second antenna impedance ZL(Ant), 872 may be generated in a conductive line in which a signal flows from the 4-1c-th via hole 431*c* to the second antenna 902.

The third antenna impedance ZL(Ant), 873 may be generated in a conductive line in which a signal flows from the 4-2a-th via hole 432*a* to the third antenna 903.

The fourth antenna impedance ZL(Ant), 874 may be generated in a conductive line in which a signal flows from the 4-2c-th via hole 432*c* to the fourth antenna 902.

The second via impedance Zvia2, 831 and 832 may be determined based on at least one of distances of conductive lines in which the second dividing impedance Z2, 841 to 844, the antenna impedance ZL (Ant. 1), 871 to 874, and the antenna impedance ZL (Ant. 1), 871 to 874 are generated.

For example, the 2-1st via impedance Zvia2. 831 may be determined based on at least one of the 2-1st dividing impedance Z2, 841, the 2-2nd dividing impedance Z2, 842, the first antenna impedance ZL(Ant.1), 871, the second antenna impedance ZL(Ant.1), 872, a distance of a conductive line in which the first antenna impedance ZL(Ant.1) 871 is generated, and a distance of a conductive line in which the second antenna impedance ZL(Ant.1) 872 is generated.

For example, the 2-1st via impedance Zvia2, 831 may be determined based on a separation distance d3 between edges of the 2a-th via pad 221 and the 2a-th etching area 211*a*.

The 2-1st via impedance Zvia2, 831 may be determined based on a separation distance d3 between edges of the 3-1st via pad 321 and the 3-1st etching area 311.

The 2-1st via impedance Zvia2, 831 may be determined based on a separation distance d3 between edges of the 4-1b-th via pad 421*b* and the 4-1c-th etching area 411*c*.

The 2-4st via impedance Zvia2, 831 may be determined based on at least one of a separation distance d3 between edges of the 2a-th via pad 221 and the 2a-th etching area 211*a*, a separation distance d3 between edges of the 3-1st via pad 321 and the 3-1st etching area 311, and a separation distance d3 between edges of the 4-1b-th via pad 421*b* and the 4-1c-th etching area 411*c*.

The separation distance d3 between edges of the 2a-th via pad 221 and the 2a-th etching area 211*a*, the separation distance d3 between edges of the 3-1st via pad 321 and the 3-1st etching area 311, and the separation distance d3 between edges of the 4-1b-th via pad 421*b* and the 4-1c-th etching area 411*c* may be the same or different.

Figure 13:
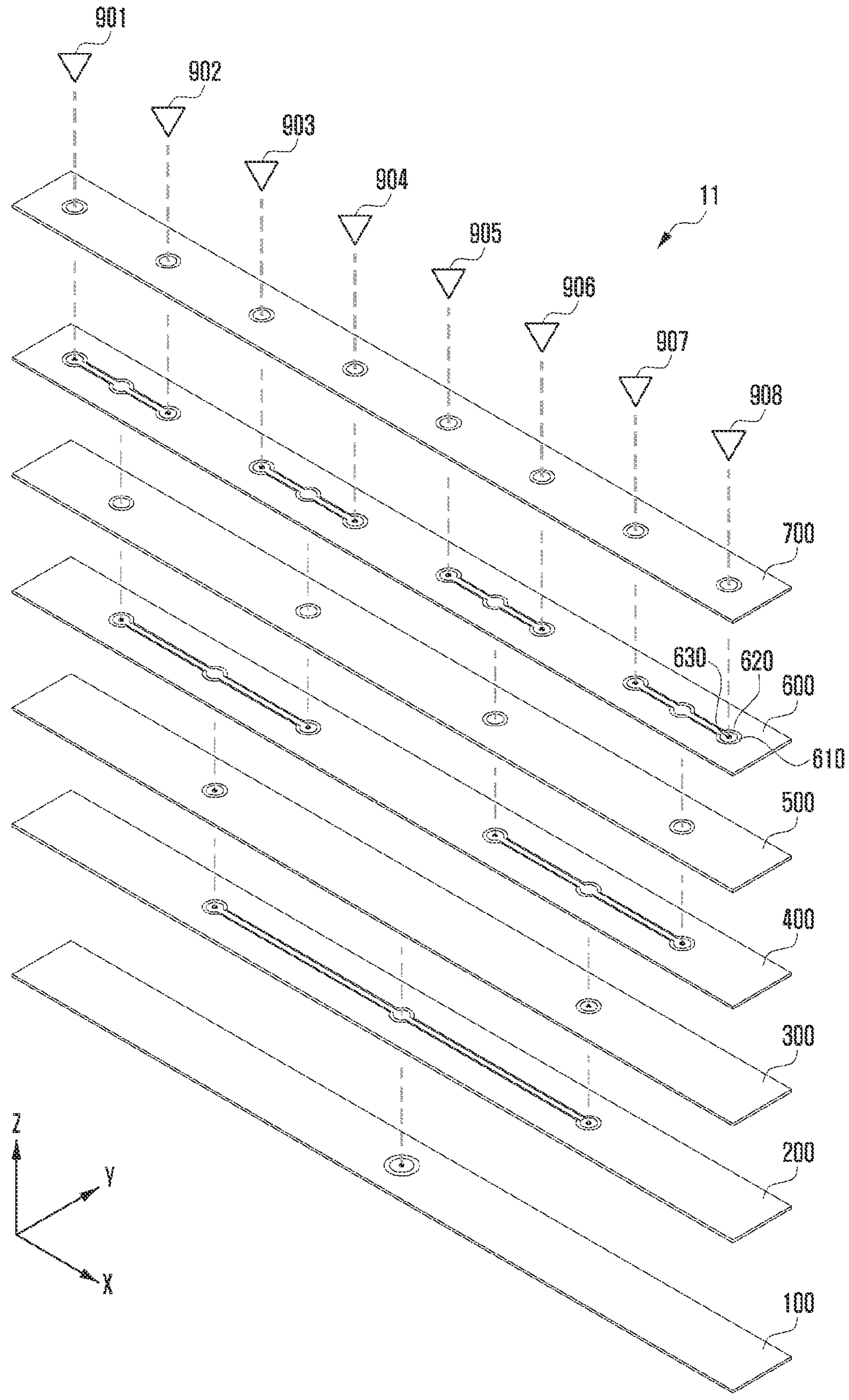
FIG. 13 is a conceptual diagram illustrating an antenna module 11 according to various embodiments.

FIG. 13 is a conceptual diagram illustrating an antenna module 11 according to various embodiments.

With reference to FIG. 13, the antenna module 11 may further include a sixth layer 600 and a seventh layer 700.

The sixth layer 600 may be stacked on one surface of the fifth layer 500. The sixth layer 600 may include a sixth etching area 610, a sixth via pad 620, and a sixth via hole 630.

The seventh layer 700 may be stacked on one surface of the sixth layer 600. The seventh layer 700 may include a seventh etching area 710 and a seventh via pad 720.

Figure 14:
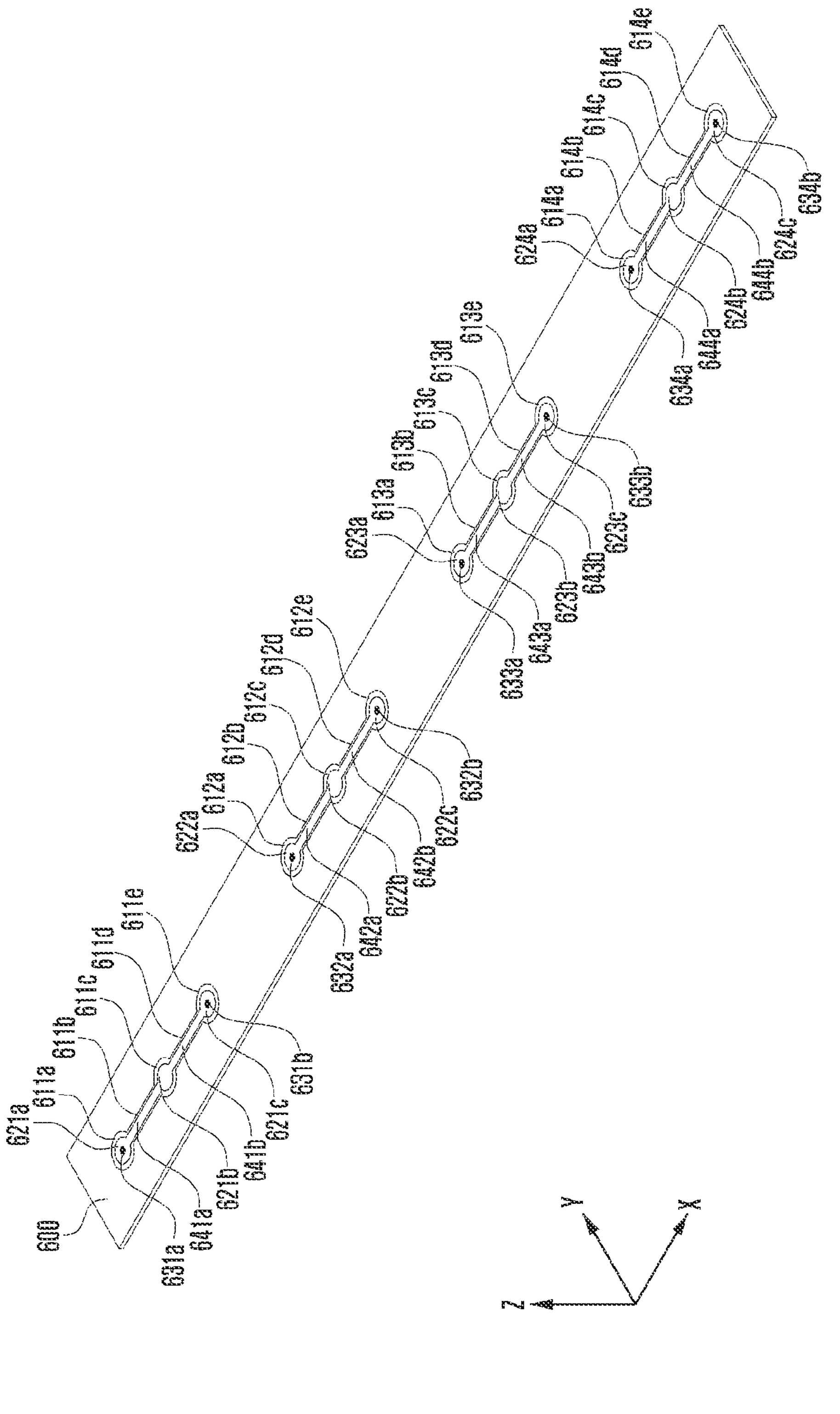
FIG. 14 is a conceptual diagram illustrating a sixth layer 600 of an antenna module 11 according to various embodiments.

For example, the sixth layer 600 may be the same as that illustrated in FIG. 14. The seventh layer 700 may be the same as that illustrated in FIG. 15.

FIG. 14 is a conceptual diagram illustrating a sixth layer 600 of an antenna module 1 according to various embodiments.

With reference to FIG. 14, a sixth etching area 610 may be etched portions of the sixth layer 600. For example, the sixth etching area 610 may be areas penetrating the fourth layer 600 in the z-axis direction.

The sixth etching area 610 may include a 6-1st etching area 611, a 6-2nd etching area 612, a 6-3rd etching area 613, and a 6-4th etching area 614.

The 6-1st etching area 611, the 6-2nd etching area 612, the 6-3rd etching area 613, and the 6-4th etching area 614 may be formed to be spaced apart from each other by a predetermined distance in the x-axis direction on the sixth layer 600.

The 6-1st etching area 611 may include a 6-1a-th etching area 611*a*, a 6-1b-th etching area 611*b*, a 6-1c-th etching area 611, a 6-1d-th etching area 611*d*, and a 6-1e-th etching area 611*e*.

The 6-1a-th etching area 611*a*, the 6-1c-th etching area 611*c*, and the 6-1e-th etching area 611*e* may be formed to be spaced apart from each other by a predetermined distance in the x-axis direction on the sixth layer.

The 6-1b-th etching area 611*b* may be formed between the 6-1a-th etching area 611*a* and the 6-1c-th etching area 611*c*.

The 6-1d-th etching area 611*d* may be formed between the 6-1c-th etching area 611*c* and the 6-1e-th etching area 611*e*.

The 6-2nd etching area 612 may include a 6-2a-th etching area 612*a*, a 6-2b-th etching area 612*b*, a 6-2c-th etching area 612*c*, a 6-2d-th etching area 612*d*, and a 6-2e-th etching area 612*e*.

The 6-2a-th etching area 612*a*, the 6-2c-th etching area 612*c*, and the 6-2e-th etching area 612*e* may be formed to be spaced apart from each other by a predetermined distance in the x-axis direction on the sixth layer.

The 6-2b-th etching area 612*b* may be formed between the 6-2a-th etching area 612*a* and the 6-2c-th etching area 612*c*.

The 6-2d-th etching area 612*d* may be formed between the 6-2c-th etching area 612*c* and the 6-2e-th etching area 612*e*.

The 6-3th etching area 613 may include a 6-3a-th etching area 613*a*, a 6-3b-th etching area 613*b*, a 6-3c-th etching area 613*c*, a 6-3d-th etching area 613*d*, and a 6-3e-th etching area 613*e*.

The 6-3a-th etching area 613*a*, the 6-3c-th etching area 613*c*, and the 6-3e-th etching area 613*e* may be formed to be spaced apart from each other by a predetermined distance in the x-axis direction on the sixth layer.

The 6-3b-th etching area 613*b* may be formed between the 6-3a-th etching area 613*a* and the 6-3c-th etching area 611*c*.

The 6-3d-th etching area 613*d* may be formed between the 6-3c-th etching area 613*c* and the 6-3e-th etching area 613*e*.

The 6-4th etching area 614 may include a 6-4a-th etching area 614*a*, a 6-4b-th etching area 614*b*, a 6-4c-th etching area 614*c*, a 6-4d-th etching area 614*d*, and a 6-4e-th etching area 614*e*.

The 6-4a-th etching area 614*a*, the 6-4c-th etching area 614*c*, and the 6-4e-th etching area 614*e* may be formed to be spaced apart from each other by a predetermined distance in the x-axis direction on the sixth layer.

The 6-4b-th etching area 614*b* may be formed between the 6-4a-th etching area 614*a* and the 6-4c-th etching area 614*c*.

The 6-4d-th etching area 614*d* may be formed between the 6-4c-th etching area 614*c* and the 6-4e-th etching area 614*e*.

The sixth via pad 620 may include a 6-1st via pad 621, a 6-2nd via pad 622, a 6-3rd via pad 623, and a 6-4th via pad 624.

The 6-1st via pad 621 may be disposed in the 6-1st etching area 611. For example, the 6-1st via pad 621 may be spaced apart from an edge of the 6-1st etching area 611 by a predetermined distance.

The 6-2nd via pad 622 may be disposed in the 6-2nd etching area 612. For example, the 6-2nd via pad 622 may be spaced apart from an edge of the 6-2nd etching area 612 by a predetermined distance.

The 6-1th via pad 621 may include a 6-1a-th via pad 621*a*, a 6-1b-th via pad 621*b*, and a 6-1c-th via pad 621*c*. A length of a width of each of the 6-1st via pads 621 may be the same or similar.

For example, the 6-1a-th via pad 621*a* may be disposed in the 6-1a-th etching area 611*a*. A length of a width of the 6-1a-th via pad 621*a* may be smaller than that of the 6-1a-th etching area 611*a*. For example, the 6-1a-th via pad 621*a* may be spaced apart from an edge of the 6-1a-th etching area 611*a* by a predetermined distance.

The 6-1b-th via pad 621*b* may be disposed in the 6-1c-th etching area 611*c*. A length of a width of the 6-1b-th via pad 621*b* may be smaller than that of the 6-1c-th etching area 611*c*. For example, the 6-1b-th via pad 621*b* may be spaced apart from an edge of the 6-1c-th etching area 611*c* by a predetermined distance. The 6-1b-th via pad 621*b* may be electrically connected to the 5-1st via hole 531. For example, one end of the 5-1st via hole 531 may be electrically connected to the other surface of the 6-1b-th via pad 621*b*.

The 6-1e-th via pad 621*c* may be disposed in the 6-1e-th etching area 611*e*. A length of a width of the 6-1c-th via pad 621*c* may be smaller than that of the 6-1e-th etching area 611*e*. For example, the 6-1c-th via pad 621*c* may be spaced apart from an edge of the 6-1e-th etching area 611*e* by a predetermined distance.

The 6-2nd via pad 622 may include a 6-2a-th via pad 622*a*, a 6-2b-th via pad 622*b*, and a 6-2c-th via pad 622*c*. A length of a width of each of the plurality of 6-2nd via pads 622 may be the same or similar.

For example, the 6-2a-th via pad 622*a* may be disposed in the 6-2a-th etching area 612*a*. A length of a width of the 6-2a-th via pad 622*a* may be smaller than that of the 6-2a-th etching area 612*a*. For example, the 6-2a-th via pad 622*a* may be spaced apart from an edge of the 6-2a-th etching area 612*a* by a predetermined distance.

The 6-2b-th via pad 622*b* may be disposed in the 6-2c-th etching area 612*c*. A length of a width of the 6-2b-th via pad 622*b* may be smaller than that of the 6-2c-th etching area 612*c*. For example, the 6-2b-th via pad 622*b* may be spaced apart from an edge of the 6-2c-th etching area 612*c* by a predetermined distance. The 6-2b-th via pad 622*b* may be electrically connected to the 6-2nd via hole 632. For example, one end of the 6-2nd via hole 632 may be electrically connected to the other surface of the 6-2b-th via pad 622*b*.

The 6-2c-th via pad 622*c* may be disposed in the 6-2e-th etching area 612*e*. A length of a width of the 6-2c-th via pad 622*c* may be smaller than that of the 6-2e-th etching area 612*e* For example, the 6-2c-th via pad 622*c* may be spaced apart from an edge of the 6-2e-th etching area 612*e* by a predetermined distance.

The 6-3rd via pad 623 may be disposed in the 6-3rd etching area 613. For example, the 6-3rd via pad 623 may be spaced apart from an edge of the 6-3rd etching area 613 by a predetermined distance.

The 6-3rd via pad 623 may be disposed in the 6-3rd etching area 613. For example, the 6-3rd via pad 623 may be spaced apart from an edge of the 6-3rd etching area 613 by a predetermined distance.

The 6-3rd via pad 623 may include a 6-3a-th via pad 623*a*, a 6-3b-th via pad 623*b*, and a 6-3c-th via pad 623*c* A length of a width of each of the 6-3rd via pads 623 may be the same or similar.

For example, the 6-3a-th via pad 623*a* may be disposed in the 6-3a-th etching area 613*a*. A length of a width of the 6-3a-th via pad 623*a* may be smaller than that of the 6-3a-th etching area 613*a*. For example, the 6-3a-th via pad 623*a* may be spaced apart from an edge of the 6-3a-th etching area 613*a* by a predetermined distance.

The 6-3b-th via pad 623*b* may be disposed in the 6-3c-th etching area 613*c*. A length of a width of the 6-3b-th via pad 623*b* may be smaller than that of the 6-3c-th etching area 613*c*. For example, the 6-3b-th via pad 623*b* may be spaced apart from an edge of the 6-3c-th etching area 613*c* by a predetermined distance. The 6-3b-th via pad 623*b* may be electrically connected to the 5-3rd via hole 533. For example, one end of the 5-3rd via hole 533 may be electrically connected to the other surface of the 6-3b-th via pad 623*b*.

The 6-3c-th via pad 623*c* may be disposed in the 6-3e-th etching area 613*e*. A length of a width of the 6-3c-th via pad 623*c* may be smaller than that of the 6-3e-th etching area 613*e*. For example, the 6-3c-th via pad 623*c* may be spaced apart from an edge of the 6-3e-th etching area 613*e* by a predetermined distance.

The 6-4th via pad 624 may include a 6-4a-th via pad 624*a*, a 6-4b-th via pad 624*b*, and a 6-4c-th via pad 624*c*. A length of a width of each of the plurality of 6-4th via pads 624 may be the same or a similar.

For example, the 6-4a-th via pad 624*a* may be disposed in the 6-4a-th etching area 614*a*. A length of a width of the 6-4a-th via pad 624*a* may be smaller than that of the 6-4a-th etching area 614*a* For example, the 6-4a-th via pad 624*a* may be spaced apart from an edge of the 6-4a-th etching area 614*a* by a predetermined distance.

The 6-4b-th via pad 624*b* may be disposed in the 6-4c-th etching area 614*c*. A length of a width of the 6-4b-th via pad 624*b* may be smaller than that of the 6-4c-th etching area 614*c*. For example, the 6-4b-th via pad 624*b* may be spaced apart from an edge of the 6-4c-th etching area 614*c* by a predetermined distance. The 6-4b-th via pad 624*b* may be electrically connected to the 6-4th via hole 634. For example, one end of the 6-4th via hole 634 may be electrically connected to the other surface of the 6-4b-th via pad 624*b*.

The 6-4c-th via pad 624*c* may be disposed in the 6-4e-th etching area 614*e*. A length of a width of the 6-4c-th via pad 624*c* may be smaller than that of the 6-4e-th etching area 614*e*. For example, the 6-4c-th via pad 624*c* may be spaced apart from an edge of the 6-4e-th etching area 614*e* by a predetermined distance.

A length of a width of each of the sixth via holes 630 may be smaller than that of each of the sixth via pads 620. The sixth via hole 630 may include a 6-1a-th via hole 631*a*, a 6-1b-th via hole 631*b*, a 6-2a-th via hole 632*a*, a 6-2b-th via hole 632*b*, a 6-3a-th via hole 633*a*, a 6-3b-th via hole 633*b*, a 6-4a-th via hole 634*a*, and a 6-4b-th via hole 634*b*.

The 6-1a-th via hole 631*a* may be disposed at one surface of the 6-1a-th via pad 62*l* a. A length of a width of the 6-1a-th via hole 631*a* may be smaller than that of the 6-1a-th via pad 621*a*.

The 6-1b-th via hole 631*b* may be disposed at one surface of the 6-1c-th via pad 621*c*. A length of a width of the 6-1b-th via hole 631*b* may be smaller than that of the 6-1c-th via pad 621*c*.

The 6-2a-th via hole 632*a* may be disposed at one surface of the 6-2a-th via pad 622*a*. A length of a width of the 6-2a-th via hole 632*a* may be smaller than that of the 6-2a-th via pad 622*a*.

The 6-2b-th via hole 632*b* may be disposed at one surface of the 6-2c-th via pad 622*c*. A length of a width of the 6-2b-th via hole 632*b* may be smaller than that of the 6-2c-th via pad 622*c*.

The 6-3a-th via hole 633*a* may be disposed at one surface of the 6-3a-th via pad 623*a*. A length of a width of the 6-3a-th via hole 633*a* may be smaller than that of the 6-3a-th via pad 623*a*.

The 6-3b-th via hole 633*b* may be disposed at one surface of the 6-3c-th via pad 623*c*. A length of a width of the 6-3b-th via hole 633*b* may be smaller than that of the 6-3c-th via pad 623*c*.

The 6-4a-th via hole 634*a* may be disposed at one surface of the 6-4a-th via pad 624*a* A length of a width of the 6-4a-th via hole 634*a* may be smaller than that of the 6-4a-th via pad 624*a*.

The 6-4b-th via hole 634*b* may be disposed at one surface of the 6-4c-th via pad 624*c*. A length of a width of the 6-4b-th via hole 634*b* may be smaller than that of the 6-4c-th via pad 624*c*.

The sixth dividing line 640 may include a 6-1a-th dividing line 641*a*, a 6-1b-th dividing line 641*b*, a 6-2a-th dividing line 642*a*, a 6-2b-th dividing line 642*b*, a 6-3a-th dividing line 643*a*, a 6-3b-th dividing line 643*b*, a 6-4a-th dividing line 644*a*, and a 6-4b-th dividing line 644*b*.

The 6-1a-th dividing line 641*a* may be disposed between the 6-1a-th via pad 621*a* and the 6-1b-th via pad 621*b*. For example, one end of the 6-1a-th dividing line 641*a* may be electrically connected to the 6-1a-th via pad 621*a*. The other end of the 6-1a-th dividing line 641*a* may be electrically connected to the 6-1b-th via pad 621*b*.

The 6-1a-th dividing line 641*a* may be disposed in the 6-1b-th etching area 611*b*. A length of a width of the 6-1a-th dividing line 641*a* may be smaller than that of the 6-1b-th etching area 611*b*. For example, the 6-1a-th dividing line 641*a* may be spaced apart from the 6-1b-th etching area 611*b* by a predetermined distance.

The 6-1b-th dividing line 641*b* may be disposed between the 6-1b-th via pad 621*b* and the 6-1c-th via pad 621*c*. For example, one end of the 6-1b-th dividing line 641*b* may be electrically connected to the 6-1b-th via pad 621*b*. The other end of the 6-1b-th dividing line 641*b* may be electrically connected to the 6-1c-th via pad 621*c*.

The 6-1b-th dividing line 641*b* may be disposed in the 6-1d-th etching area 611*d*. A length of a width of the 6-1b-th dividing line 641*b* may be smaller than that of the 6-1d-th etching area 611*d*. For example, the 6-1b-th dividing line 641*b* may be spaced apart from the 6-1d-th etching area 611*d* by a predetermined distance.

The 6-2a-th dividing line 642*a* may be disposed between the 6-2a-th via pad 622*a* and the 6-2b-th via pad 622*b*. For example, one end of the 6-2a-th dividing line 642*a* may be electrically connected to the 6-2a-th via pad 622*a*. The other end of the 6-2a-th dividing line 642*a* may be electrically connected to the 6-2b-th via pad 622*b*.

The 6-2a-th dividing line 642*a* may be disposed in the 6-2b-th etching area 612*b* A length of a width of the 6-2a-th dividing line 642*a* may be smaller than that of the 6-2b-th etching area 612*b*. For example, the 6-2a-th dividing line 642*a* may be spaced apart from the 6-2b-th etching area 612*b* by a predetermined distance.

The 6-2b-th dividing line 642*b* may be disposed between the 6-2b-th via pad 622*b* and the 6-2c-th via pad 622*c*. For example, one end of the 6-2b-th dividing line 642*b* may be electrically connected to the 6-2b-th via pad 622*b*. The other end of the 6-2b-th dividing line 642*b* may be electrically connected to the 6-2c-th via pad 622*c*.

The 6-2b-th dividing line 642*b* may be disposed in the 6-2d-th etching area 612*d*. A length of a width of the 6-2b-th dividing line 642*b* may be smaller than that of the 6-2d-th etching area 612*d*. For example, the 6-2b-th dividing line 642*b* may be spaced apart from the 6-2d-th etching area 612*d* by a predetermined distance.

The 6-3a-th dividing line 643*a* may be disposed between the 6-3a-th via pad 623*a* and the 6-3b-th via pad 623*b*. For example, one end of the 6-3a-th dividing line 643*a* may be electrically connected to the 6-3a-th via pad 623*a*. The other end of the 6-3a-th dividing line 643*a* may be electrically connected to the 6-3b-th via pad 623*b*.

The 6-3a-th dividing line 643*a* may be disposed in the 6-3b-th etching area 613*b* A length of a width of the 6-3a-th dividing line 643*a* may be smaller than that of the 6-3b-th etching area 613*b*. For example, the 6-3a-th dividing line 643*a* may be spaced apart from the 6-3b-th etching area 613*b* by a predetermined distance.

The 6-3b-th dividing line 643*b* may be disposed between the 6-3b-th via pad 623*b* and the 6-3c-th via pad 623*c*. For example, one end of the 6-3b-th dividing line 643*b* may be electrically connected to the 6-3b-th via pad 623*b*. The other end of the 6-3b-th dividing line 643*b* may be electrically connected to the 6-3c-th via pad 623*c*.

The 6-3b-th dividing line 643*b* may be disposed in the 6-3d-th etching area 613*d* A length of a width of the 6-3b-th dividing line 643*b* may be smaller than that of the 6-3d-th etching area 613*d*. For example, the 6-3b-th dividing line 643*b* may be spaced apart from the 6-3d-th etching area 613*d* by a predetermined distance.

The 6-4a-th dividing line 644*a* may be disposed between the 6-4a-th via pad 624*a* and the 6-4b-th via pad 624*b*. For example, one end of the 6-4a-th dividing line 644*a* may be electrically connected to the 6-4a-th via pad 624*a*. The other end of the 6-4a-th dividing line 644*a* may be electrically connected to the 6-4b-th via pad 624*b*.

The 6-4a-th dividing line 644*a* may be disposed in the 6-4b-th etching area 614*b* A length of a width of the 6-4a-th dividing line 644*a* may be smaller than that of the 6-4b-th etching area 614*b*. For example, the 6-4a-th dividing line 644*a* may be spaced apart from the 6-4b-th etching area 614*b* by a predetermined distance.

The 6-4b-th dividing line 644*b* may be disposed between the 6-4b-th via pad 624*b* and the 6-4c-th via pad 624*c*. For example, one end of the 6-4b-th dividing line 644*b* may be electrically connected to the 6-4b-th via pad 624*b*. The other end of the 6-4b-th dividing line 644*b* may be electrically connected to the 6-4c-th via pad 624*c*.

The 6-4b-th dividing line 644*b* may be disposed in the 6-4d-th etching area 614*d* A length of a width of the 6-4b-th dividing line 644*b* may be smaller than that of the 6-4d-th etching area 614*d*. For example, the 6-4b-th dividing line 644*b* may be spaced apart from the 6-4d-th etching area 614*d* by a predetermined distance.

Figure 15:
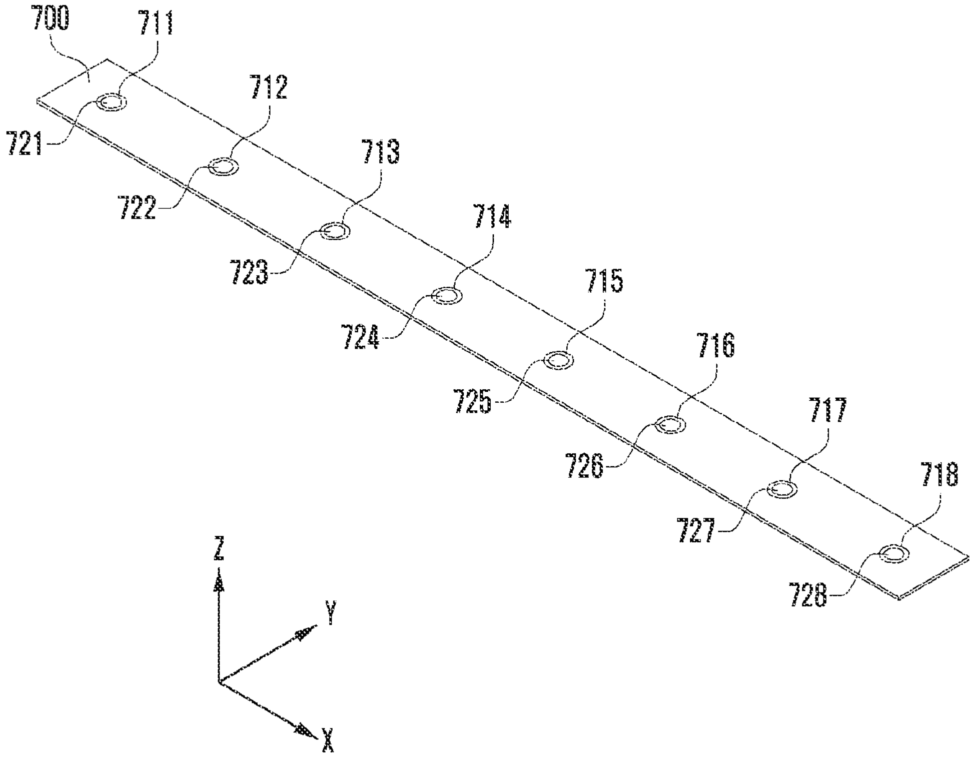
FIG. 15 is a conceptual diagram illustrating a seventh layer 700 of an antenna module 11 according to various embodiments.
Figure 16:
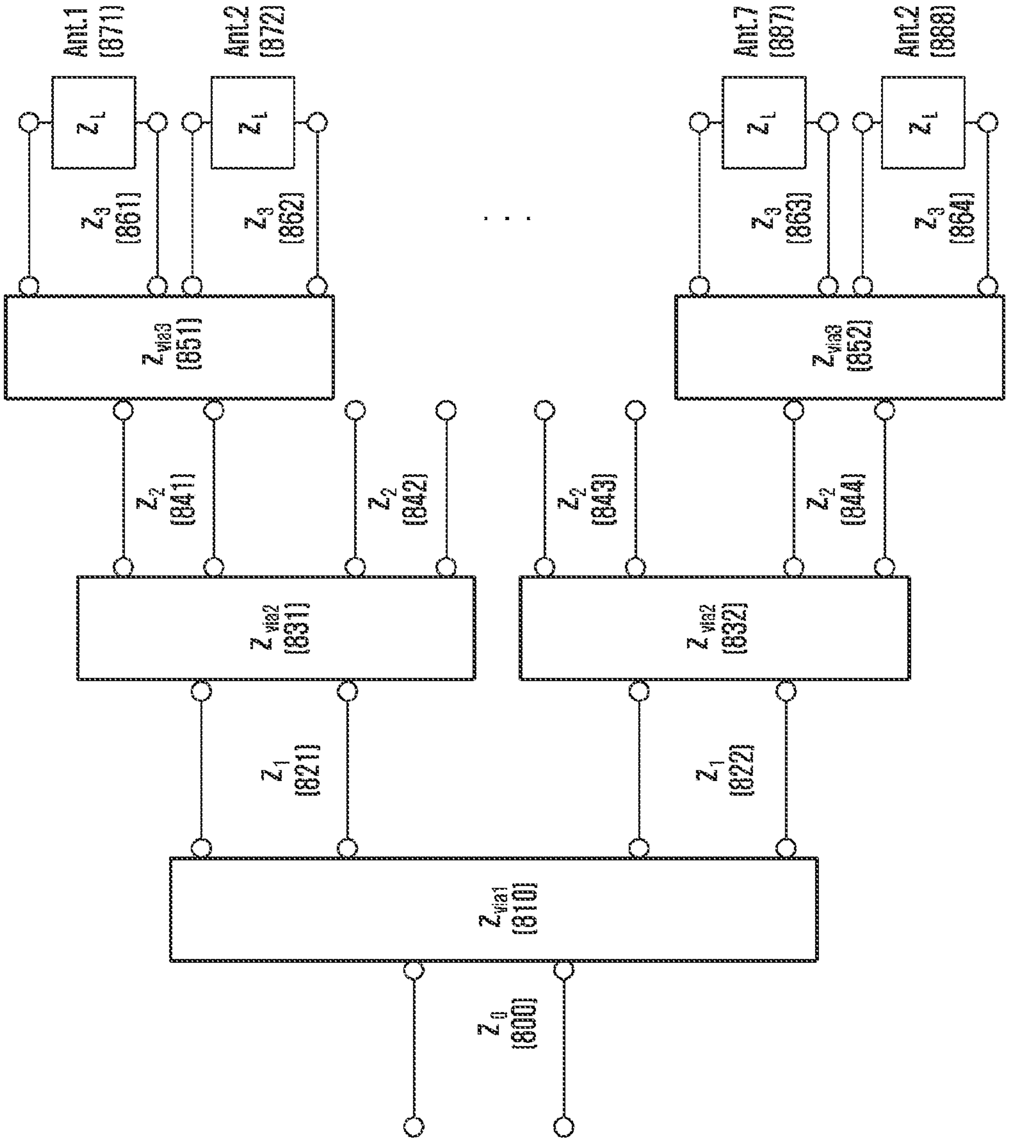
Figure 17:
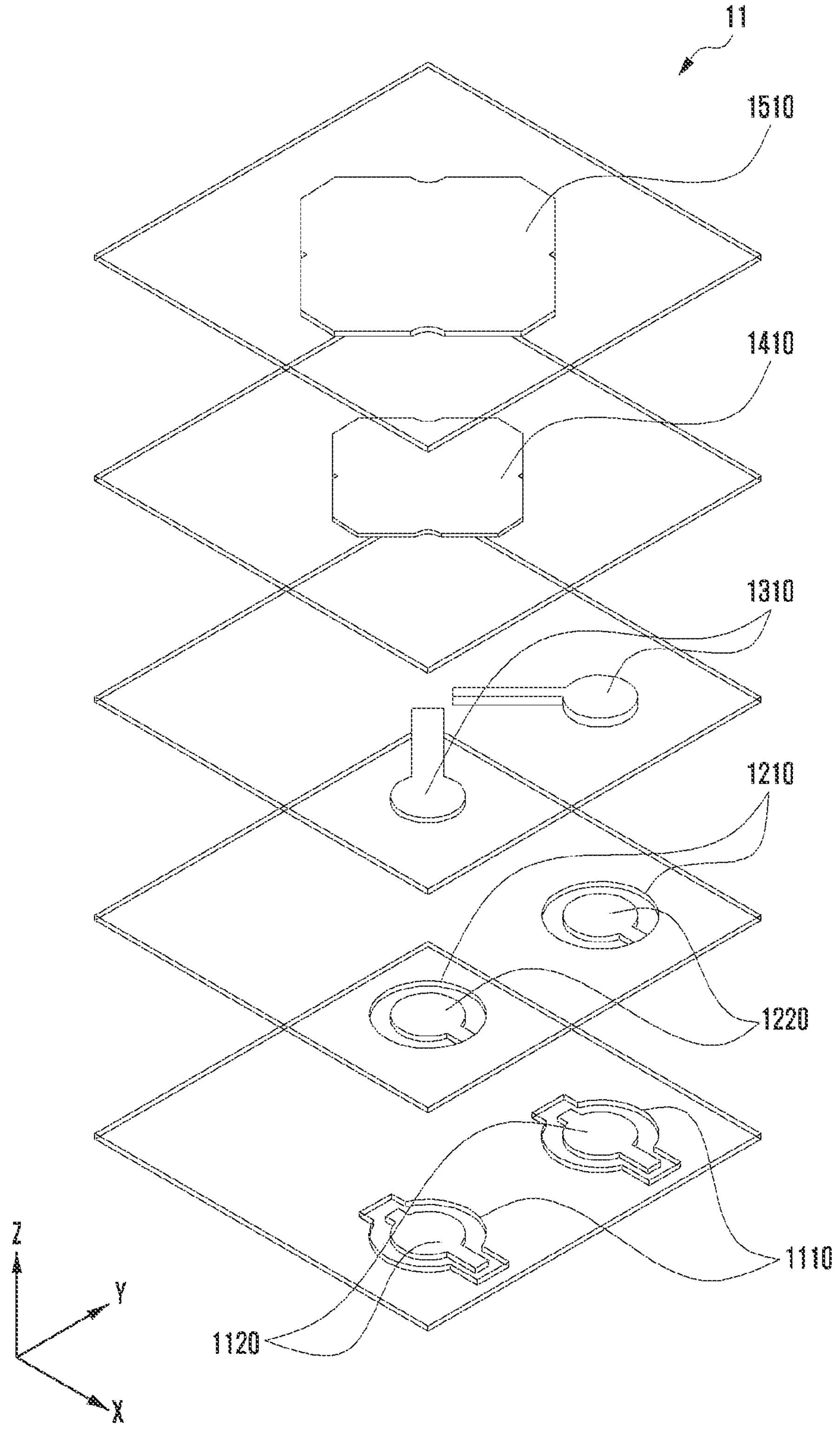
Figure 18:
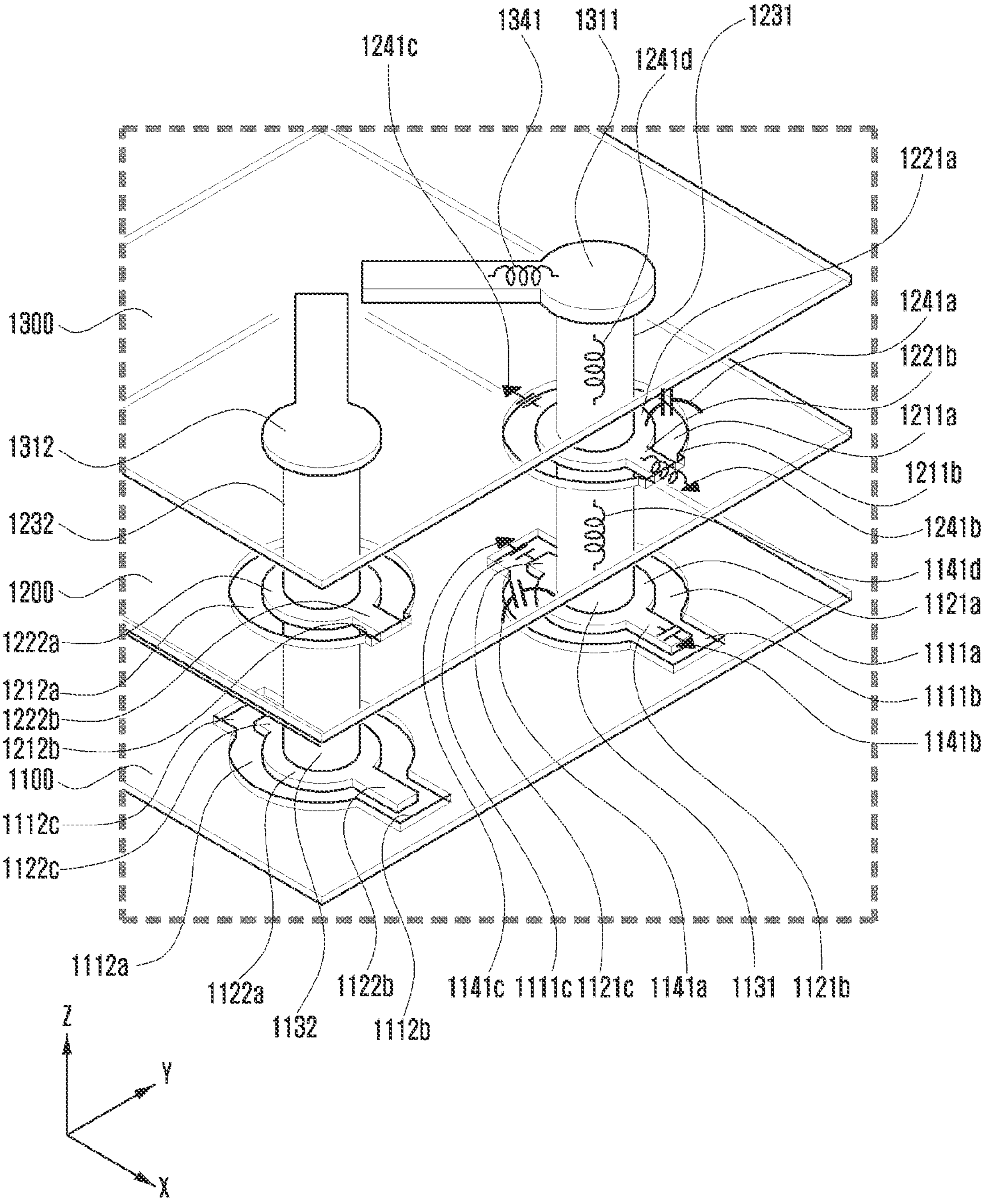

FIG. 15 is a conceptual diagram illustrating a seventh layer 700 of an antenna module 11 according to various embodiments.

With reference to FIG. 15, a seventh etching area 710 may be an etched portion of the seventh layer 700. For example, the seventh etching area 710 may be an area penetrating the seventh layer 700 in the z-axis direction.

The seventh etching area 710 may include a 7-1st etching area 711, a 7-2nd etching area 712, a 7-3rd etching area 713, a 7-4th etching area 714, a 7-5th etching area 715, a 7-6th etching area 716, a 7-7th etching area 717, and a 7-8th etching area 718.

The 7-1st etching area 711, the 7-2nd etching area 712, the 7-3rd etching area 713, the 7-4th etching area 714, the 7-5th etching area 715, the 7-6th etching area 716, the 7-7th etching area 717, and the 7-8th etching area 718 may be formed to be spaced apart from each other by a predetermined distance in the x-axis direction on the seventh layer 700.

The plurality of seventh via pads 720 may include a 7-1st via pad 721, a 7-2nd via pad 722, a 7-3rd via pad 723, a 7-4th via pad 724, a 7-5th via pad 725, a 7-6th via pad 726, a 7-7th via pad 727, and a 7-8th via pad 728.

The 7-1st via pad 721 may be disposed in the 7-1st etching area 711. A length of a width of the 7-1st via pad 721 may be smaller than that of the 7-1st etching area 711. For example, the 7-1st via pad 721 may be spaced apart from an edge of the 7-1st etching area 711 by a predetermined distance. The 7-1th via pad 721 may be electrically connected to the 6-1a-th via hole 631*a*. For example, one end of the 6-1a-th via hole 631*a* may be electrically connected to the other surface of the 7-1 st via pad 721.

The 7-2nd via pad 722 may be disposed in the 7-2nd etching area 712. A length of a width of the 7-2nd via pad 722 may be smaller than that of the 7-2nd etching area 712. For example, the 7-2nd via pad 722 may be spaced apart from an edge of the 7-2nd etching area 712 by a predetermined distance. The 7-2nd via pad 722 may be electrically connected to the 6-1b-th via hole 631*b*. For example, one end of the 6-1b-th via hole 631*b* may be electrically connected to the other surface of the 7-2nd via pad 722.

The 7-3rd via pad 723 may be disposed in the 7-3rd etching area 713. A length of a width of the 7-3rd via pad 723 may be smaller than that of the 7-3rd etching area 713. For example, the 7-3rd via pad 723 may be spaced apart from an edge of the 7-3rd etching area 713 by a predetermined distance. The 7-3rd via pad 723 may be electrically connected to the 6-2a-th via hole 632*a*. For example, one end of the 6-2a-th via hole 632*a* may be electrically connected to the other surface of the 7-3rd via pad 723.

The 7-4th via pad 724 may be disposed in the 7-4th etching area 714. A length of a width of the 7-4th via pad 724 may be smaller than that of the 7-4th etching area 714. For example, the 7-4th via pad 724 may be spaced apart from an edge of the 7-4th etching area 714 by a predetermined distance. The 7-4th via pad 724 may be electrically connected to the 6-2b-th via hole 632*b*. For example, one end of the 6-2b-th via hole 632*b* may be electrically connected to the other surface of the 7-4th via pad 724.

The 7-5th via pad 725 may be disposed in the 7-5th etching area 715. A length of a width of the 7-5th via pad 725 may be smaller than that of the 7-5th etching area 715. For example, the 7-5th via pad 725 may be spaced apart from an edge of the 7-5th etching area 715 by a predetermined distance. The 7-5th via pad 725 may be electrically connected to the 6-3a-th via hole 631*a*. For example, one end of the 6-3a-th via hole 633*a* may be electrically connected to the other surface of the 7-5th via pad 725.

The 7-6th via pad 726 may be disposed in the 7-6th etching area 716. A length of a width of the 7-6th via pad 726 may be smaller than that of the 7-6th etching area 716. For example, the 7-6th via pad 726 may be spaced apart from an edge of the 7-6th etching area 716 by a predetermined distance. The 7-6th via pad 726 may be electrically connected to the 6-3b-th via hole 633*b*. For example, one end of the 6-3b-th via hole 633*b* may be electrically connected to the other surface of the 7-6th via pad 726.

The 7-7th via pad 727 may be disposed in the 7-7th etching area 717. A length of a width of the 7-7th via pad 727 may be smaller than that of the 7-7th etching area 717. For example, the 7-7th via pad 727 may be spaced apart from an edge of the 7-7th etching area 717 by a predetermined distance. The 7-7th via pad 727 may be electrically connected to the 6-4a-th via hole 634*a*. For example, one end of the 6-4a-th via hole 634*a* may be electrically connected to the other surface of the 7-7th via pad 727.

The 7-8th via pad 728 may be disposed in the 7-8th etching area 718. A length of a width of the 7-8th via pad 728 may be smaller than that of the 7-8th etching area 718. For example, the 7-8th via pad 728 may be spaced apart from an edge of the 7-8th etching area 718 by a predetermined distance. The 7-8th via pad 728 may be electrically connected to the 6-4b-th via hole 634*b*. For example, one end of the 6-4b-th via hole 634*b* may be electrically connected to the other surface of the 7-8th via pad 728.

The plurality of antennas 901 to 908 may be electrically connected to the plurality of seventh via pads 720. For example, the first antenna 901 may be electrically connected to one surface of the 7-1st via pad 721. The second antenna 902 may be electrically connected to one surface of the 7-2nd via pad 722. The third antenna 903 may be electrically connected to one surface of the 7-3rd via pad 723. The fourth antenna 904 may be electrically connected to one surface of the 7-4th via pad 724. The fifth antenna 905 may be electrically connected to one surface of the 7-5th via pad 725. The sixth antenna 906 may be electrically connected to one surface of the 7-6th via pad 726. The seventh antenna 907 may be electrically connected to one surface of the 7-7th via pad 727. The eighth antenna 908 may be electrically connected to one surface of the 7-8th via pad 728.

In the specific embodiments of the disclosure described above, components included in the disclosure were expressed in the singular or plural according to presented specific embodiments. However, the singular or plural expression is appropriately selected for a situation presented for convenience of description, and the disclosure is not limited to the singular or plural components, and even if a component is represented in the plural, it may be formed with the singular, or even if a component is represented in the singular, it may be formed with the plural.

In the detailed description of the disclosure, although specific embodiments have been described, various modifications are possible without departing from the scope of the disclosure Therefore, the scope of the disclosure should not be limited to the described embodiments and should be defined by the claims described below as well as by those equivalent to the claims.

INDUSTRIAL APPLICABILITY

The disclosure may be used in the electronics industry and information communication industry.

The invention claimed is:

1. An antenna module, comprising:

a first layer including a first etching area, a first via pad disposed to be spaced apart from an edge of the first etching area, and a first via hole disposed at one surface of the first via pad;

a second layer stacked on one surface of the first layer and including a second etching area, a plurality of second via pads disposed to be spaced apart from an edge of the second etching area, a plurality of second via holes disposed at one surface of the plurality of second via pads, and a plurality of second dividing lines configured to electrically connect the plurality of second via pads;

a third layer stacked on one surface of the second layer and including a plurality of third etching areas, a plurality of third via pads disposed to be spaced apart from an edge of the plurality of third etching areas, and a plurality of third via holes disposed at one surface of the plurality of third via pads;

a fourth layer stacked on one surface of the third layer and including a plurality of fourth etching areas, a plurality of fourth pads disposed to be spaced apart from edges of the plurality of fourth etching areas, a plurality of fourth via holes disposed at one surface of the plurality of fourth via pads, and a plurality of fourth dividing lines;

a fifth layer stacked on one surface of the fourth layer and including a plurality of fifth etching areas and a plurality of fifth via pads disposed to be spaced apart from edges of the plurality of fifth etching areas; and a plurality of antennas electrically connected to the plurality of fifth via pads.

2. The antenna module of claim 1, wherein the plurality of second via pads comprise a 2a-th via pad, a 2b-th via pad, and a 2c-th via pad.

3. The antenna module of claim 2, wherein one end of the first via hole is electrically connected to the other end of the 2b-th via pad, and the other end of the first via hole is electrically connected to one end of the first via pad.

4. The antenna module of claim 1, wherein the plurality of second via holes comprise a 2a-th via hole and a 2b-th via hole, and the plurality of third via pads comprise a 3a-th via pad and a 3b-th via pad.

5. The antenna module of claim 4, wherein one end of the 2a-th via hole is electrically connected to the other end of the 3a-th via pad, and the other end of the 2a-th via hole is electrically connected to one end of the 2a-th via pad.

6. The antenna module of claim 4, wherein one end of the 2b-th via hole is electrically connected to the other end of the 3b-th via pad, and the other end of the 2b-th via hole is electrically connected to one end of the 2c-th via pad.

7. The antenna module of claim 1, wherein the plurality of second dividing lines comprise a 2a-th dividing line and a 2b-th dividing line.

8. The antenna module of claim 7, wherein one end of the 2a-th dividing line is electrically connected to the 2a-th via pad, and the other end of the 2a-th dividing line is electrically connected to the 2b-th via pad.

9. The antenna module of claim 7, wherein one end of the 2b-th dividing line is electrically connected to the 2b-th via pad, and the other end of the 2b-th dividing line is electrically connected to the 2c-th via pad.

10. The antenna module of claim 1, wherein the plurality of third via holes further comprise a 3a-th via hole and a 3b-th via hole, and the plurality of fourth via pads comprise a 4a-th via pad, a 4b-th via pad, a 4c-th via pad, a 4d-th via pad, a 4e-th via pad, and a 4f-th via pad.

11. The antenna module of claim 10, wherein one end of the 3a-th via hole is electrically connected to the other end of the 4b-th via pad, and the other end of the 3a-th via hole is electrically connected to one end of the 3a-th via pad.

12. The antenna module of claim 10, wherein one end of the 3b-th via hole is electrically connected to the other end of the 4e-th via pad, and the other end of the 3b-th via hole is electrically connected to one end of the 3b-th via pad.

13. The antenna module of claim 1, wherein the plurality of fourth via holes further comprise a 4a-th via hole, a 4b-th via hole, a 4c-th via hole, and a 4d-th via hole, and the fifth via pad comprises a 5a-th via pad, a 5b-th via pad, a 5c-th via pad, and a 5d-th via pad.

14. The antenna module of claim 13, wherein one end of the 4a-th via hole is electrically connected to the other end of the 5a-th via pad, the other end of the 4a-th via hole is electrically connected to one end of the 4a-th via pad, one end of the 4b-th via hole is electrically connected to the other end of the 5b-th via pad, the other end of the 4b-th via hole is electrically connected to one end of the 4c-th via pad, one end of the 4c-th via hole is electrically connected to the other end of the 5c-th via pad, the other end of the 4c-th via hole is electrically connected to one end of the 4d-th via pad, one end of the 4d-th via hole is electrically connected to the other end of the 5d-th via pad, and the other end of the 4d-th via hole is electrically connected to one end of the 4f-th via pad.

15. The antenna module of claim 1, wherein the plurality of fourth dividing lines comprise a 4a-th dividing line, a 4b-th dividing line, a 4c-th dividing line, and a 4d-th dividing line.

* * * * *